US011783434B2

(12) United States Patent
Passolt et al.

(10) Patent No.: US 11,783,434 B2
(45) Date of Patent: Oct. 10, 2023

(54) WELL PLANNING AND DRILLING SERVICE

(71) Applicant: Schlumberger Technology Corporation, Sugar Land, TX (US)

(72) Inventors: Mark S. Passolt, Hansville, WA (US); Lucian Johnston, Sugar Land, TX (US); Jean-Marc Pietrzyk, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/905,772

(22) Filed: Jun. 18, 2020

(65) Prior Publication Data
US 2020/0320648 A1 Oct. 8, 2020

Related U.S. Application Data

(63) Continuation of application No. 15/565,193, filed as application No. PCT/US2016/027752 on Apr. 15, 2016, now Pat. No. 10,706,483.

(30) Foreign Application Priority Data

Apr. 17, 2015 (CN) .......................... 201510185455.X

(51) Int. Cl.
*G06Q 50/02* (2012.01)
*G06Q 10/06* (2023.01)
(Continued)

(52) U.S. Cl.
CPC ............. *G06Q 50/02* (2013.01); *E21B 41/00* (2013.01); *E21B 44/00* (2013.01); *E21B 47/022* (2013.01);
(Continued)

(58) Field of Classification Search
None
See application file for complete search history.

(56) References Cited

U.S. PATENT DOCUMENTS 6,021,377 A * 2/2000 Dubinsky ............... E21B 44/00
702/9
7,114,579 B2 * 10/2006 Hutchinson ............ E21B 47/04
73/152.43
(Continued)

FOREIGN PATENT DOCUMENTS

CN 101393619 A * 3/2009 ............. G06Q 10/06
CN 109488207 A * 3/2019 ......... E21B 41/0092
(Continued)

OTHER PUBLICATIONS

Paudel et al. "Quantum Computing and Simulations for Energy Applications: Review and Perspective" (https://pubs.acs.org/doi/pdf/10.1021/acsengineeringau.1c00033) (Year: 2021).*
(Continued)

*Primary Examiner* — Sujay Koneru
(74) *Attorney, Agent, or Firm* — Aashish Y. Chawla

(57) ABSTRACT

A method can include receiving information that includes well trajectory information, wellsite equipment information and driller information; based at least in part on the information, determining a level of detail of human executable well plan instructions; based at least in part on the information, generating a well plan where the well plan includes human executable well plan instructions based on the determined level of detail; and outputting the well plan.

16 Claims, 13 Drawing Sheets

(51) Int. Cl.
 E21B 41/00 (2006.01)
 E21B 44/00 (2006.01)
 E21B 47/022 (2012.01)
 E21B 49/00 (2006.01)
 E21B 7/04 (2006.01)
 E21B 47/18 (2012.01)
 G06Q 10/0631 (2023.01)

(52) U.S. Cl.
 CPC ............ *E21B 49/00* (2013.01); *G06Q 10/06* (2013.01); *G06Q 10/06313* (2013.01); *E21B 7/04* (2013.01); *E21B 47/18* (2013.01)

(56) References Cited

U.S. PATENT DOCUMENTS

| | | | |
|---|---|---|---|
| 8,812,334 B2 | 8/2014 | Gives et al. | |
| 9,064,066 B2 | 6/2015 | Kumar et al. | |
| 9,097,096 B1* | 8/2015 | Selman | E21B 47/022 |
| 9,593,567 B2* | 3/2017 | Pink | E21B 44/00 |
| 2002/0104685 A1 | 8/2002 | Pinchard et al. | |
| 2003/0075361 A1 | 4/2003 | Terry et al. | |
| 2003/0220742 A1 | 11/2003 | Niedermay et al. | |
| 2008/0264690 A1 | 10/2008 | Khan et al. | |
| 2008/0289877 A1* | 11/2008 | Nikolakis-Mouchas | E21B 44/00 702/9 |
| 2008/0314641 A1 | 12/2008 | McClard | |
| 2008/0319726 A1* | 12/2008 | Berge | E21B 41/0064 703/10 |
| 2009/0076873 A1 | 3/2009 | Johnson et al. | |
| 2009/0132458 A1 | 5/2009 | Edwards et al. | |
| 2009/0288881 A1* | 11/2009 | Mullins | E21B 47/022 175/50 |
| 2010/0078216 A1* | 4/2010 | Radford | E21B 47/01 175/40 |
| 2010/0191516 A1* | 7/2010 | Benish | E21B 43/00 703/10 |
| 2011/0153300 A1* | 6/2011 | Holl | E21B 44/00 703/10 |
| 2011/0172976 A1* | 7/2011 | Budiman | E21B 47/04 703/2 |
| 2011/0174538 A1 | 7/2011 | Chan | |
| 2011/0301924 A1* | 12/2011 | Jeffryes | E21B 44/00 703/2 |
| 2012/0253770 A1* | 10/2012 | Stern | G06F 30/20 703/10 |
| 2013/0140037 A1* | 6/2013 | Sequeira, Jr. | E21B 7/04 703/10 |
| 2013/0332125 A1 | 12/2013 | Suter et al. | |
| 2013/0341093 A1* | 12/2013 | Jardine | E21B 7/00 703/2 |
| 2014/0136168 A1* | 5/2014 | Spencer | G06F 30/20 703/2 |
| 2014/0299315 A1* | 10/2014 | Chuprakov | E21B 47/00 166/250.1 |
| 2014/0379133 A1 | 12/2014 | Toma | |
| 2015/0029034 A1 | 1/2015 | Abbassian et al. | |
| 2015/0149140 A1* | 5/2015 | Gorell | G01V 99/005 703/10 |
| 2015/0168598 A1* | 6/2015 | Fleming | E21B 43/00 703/2 |
| 2015/0220861 A1* | 8/2015 | Sanchez | E21B 47/00 705/7.27 |
| 2015/0226049 A1 | 8/2015 | Frangos et al. | |
| 2015/0240615 A1* | 8/2015 | Dykstra | E21B 44/005 700/275 |
| 2015/0286971 A1 | 10/2015 | Otalvora et al. | |
| 2015/0294258 A1 | 10/2015 | Hidebrand et al. | |
| 2015/0317585 A1 | 11/2015 | Panchai et al. | |
| 2015/0331971 A1 | 11/2015 | Scollard et al. | |
| 2016/0003008 A1* | 1/2016 | Uribe | E21B 43/30 166/250.01 |
| 2016/0040514 A1* | 2/2016 | Rahmani | G06F 17/10 703/2 |
| 2016/0097270 A1 | 4/2016 | Pobedinski et al. | |
| 2016/0138369 A1 | 5/2016 | Tunget | |
| 2016/0252897 A1 | 9/2016 | Ashok et al. | |
| 2016/0342916 A1 | 11/2016 | Arceneaux et al. | |
| 2017/0191359 A1* | 7/2017 | Dursun | E21B 44/06 |
| 2017/0205531 A1* | 7/2017 | Berard | G01V 11/00 |
| 2017/0342828 A1* | 11/2017 | Dumont | G06F 30/17 |
| 2018/0156022 A1* | 6/2018 | Miller | E21B 44/04 |
| 2019/0048703 A1* | 2/2019 | Samuel | E21B 7/04 |

FOREIGN PATENT DOCUMENTS

| | | |
|---|---|---|
| WO | 2008/151293 A2 | 12/2008 |
| WO | 2014/031186 A1 | 2/2014 |
| WO | 2014/123640 A1 | 8/2014 |

OTHER PUBLICATIONS

International Search Report and Written Opinion for the counterpart International patent application PCT/US2016/027752 dated Jul. 15, 2016.
International Preliminary Report on Patentability for the counterpart International patent application PCT/US2016/027752 dated Oct. 17, 2017.
First Office Action dated Jul. 23, 2020 for the equivalent Chinese Patent Application 201510185455 (16 pages).
Second Office Action dated Dec. 9, 2020 for the equivalent Chinese Patent Application 201510185455 (10 pages).
Third Office Action dated Jun. 3, 2021 for the equivalent Chinese Patent Application 201510185455 (11 pages).

* cited by examiner

WELL PLANNING AND DRILLING SERVICE

RELATED APPLICATIONS

This application is a continuation of co-pending U.S. patent application Ser. No. 15/565,193, filed on Oct. 9, 2017 under PCT National Phase of the International patent application number PCT/US2016/027752, filed on Apr. 15, 2016 which claims priority to and the benefit of a Patent Application filed with the State Intellectual Property Office (SIPO) of the P.R.C. (CN) having Serial No. 201510185455.X, filed 17 Apr. 2015, which is incorporated by reference herein.

BACKGROUND

A bore can be drilled into a geologic environment where the bore may be utilized for form a well. A rig may be a system of components that can be operated to form a bore in a geologic environment, to transport equipment into and out of a bore in a geologic environment, etc. As an example, a rig may include a system that can be used to drill a bore and to acquire information about a geologic environment, drilling, etc. As an example, a rig can include one or more of the following components and/or equipment: a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform. As an example, a rig or wellsite equipment may be operated to form a bore according to a plan, which may be a well plan.

SUMMARY

A method can include receiving information that includes well trajectory information, wellsite equipment information and driller information; based at least in part on the information, determining a level of detail of human executable well plan instructions; based at least in part on the information, generating a well plan where the well plan includes human executable well plan instructions based on the determined level of detail; and outputting the well plan. A system can include one or more processors; memory operatively coupled to the one or more processors; and processor-executable instructions stored in the memory and executable by at least one of the one or more processors to instruct the system to receive information that includes well trajectory information, wellsite equipment information and driller information; based at least in part on the information, determine a level of detail of human executable well plan instructions; based at least in part on the information, generate a well plan where the well plan includes human executable well plan instructions based on the determined level of detail; and output the well plan. One or more computer-readable storage media can include computer-executable instructions executable to instruct a computing system to: receive information that includes well trajectory information, wellsite equipment information and driller information; based at least in part on the information, determine a level of detail of human executable well plan instructions; based at least in part on the information, generate a well plan where the well plan includes human executable well plan instructions based on the determined level of detail; and output the well plan. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
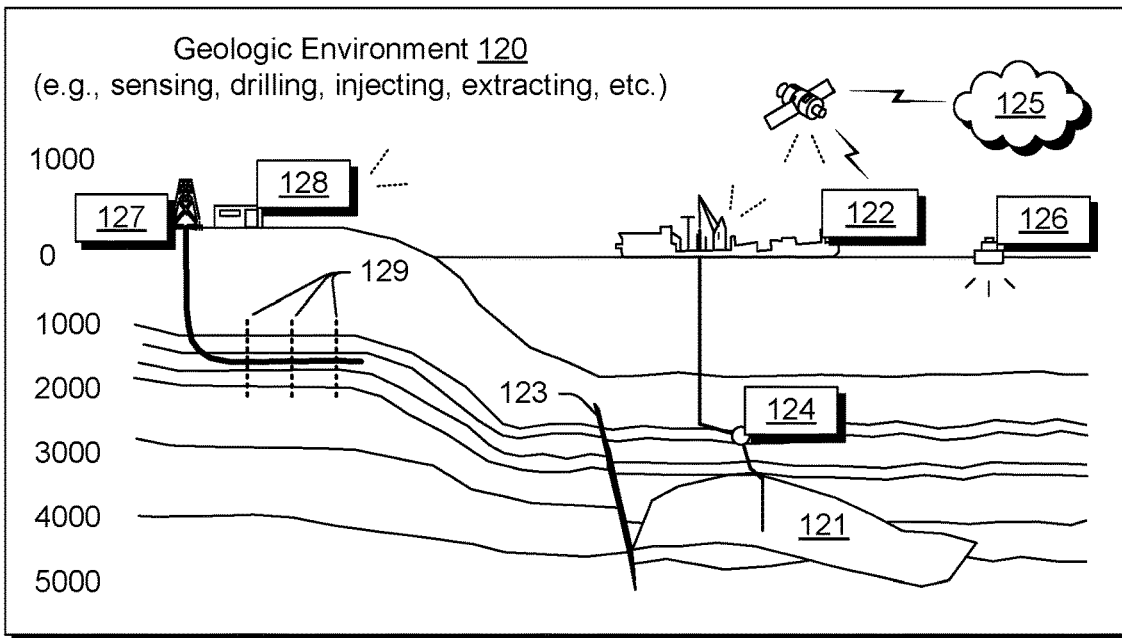
FIG. 1 illustrates examples of equipment in a geologic environment.
Figure 1:
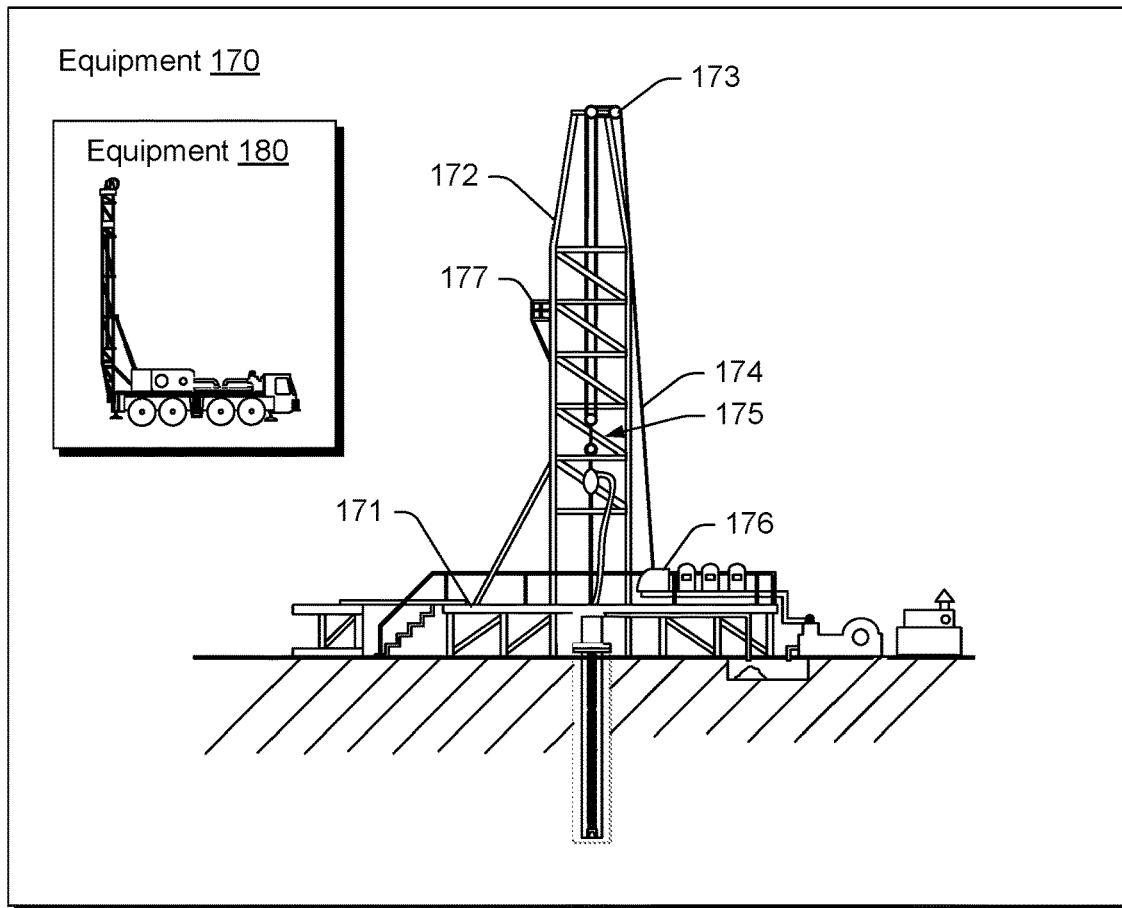

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Well planning is a process by which a path of a well can be mapped, so as to reach a reservoir, for example, to produce fluids therefrom. As an example, constraints can be imposed on a design of a well, for example, a well trajectory may be constrained via one or more physical phenomena that may impact viability of a bore, ease of drilling, etc. Thus, for example, one or more constraints may be imposed based at least in part on known geology of a subterranean domain or, for example, presence of other wells in the area (e.g., collision avoidance). As an example, one or more other constraints may be imposed, for example, consider one or more constraints germane to capabilities of tools being used and/or one or more constraints related to drilling time and risk tolerance.

As an example, a well plan can be generated based at least in part on imposed constraints and known information. As an example, a well plan may be provided to a well owner, approved, and then implemented by a drilling service provider (e.g., a directional driller or "DD").

As an example, a well design system can account for one or more capabilities of a drilling system or drilling systems that may be utilized at a wellsite. As an example, a drilling engineer may be called upon to take such capabilities into account, for example, as one or more of various designs and specifications are created. As an example, a framework may allow for entry of one or more limits where a system can alert a user if one or more of the one or more limits are exceeded.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite. As an example, a well drilling system can include selectable features, which may be enabled or disabled. As an example, where a feature is enabled and amenable to automation, information in a digital well plan can be utilized to determine how one or more automated operations are to be performed.

As an example, a well planning system can include selectable options as to portions of a well plan that allow for execution of the plan to be manual, semi-automated, automated. As an example, a graphical user interface may be rendered to a display where the graphical user interface includes various options such that a well may be planned to account for one or more modes of execution. In such an example, a digital well plan can be generated and utilized in one or more of such modes as to one or more corresponding operations. Such utilization may be automatic or under control of a driller, etc.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
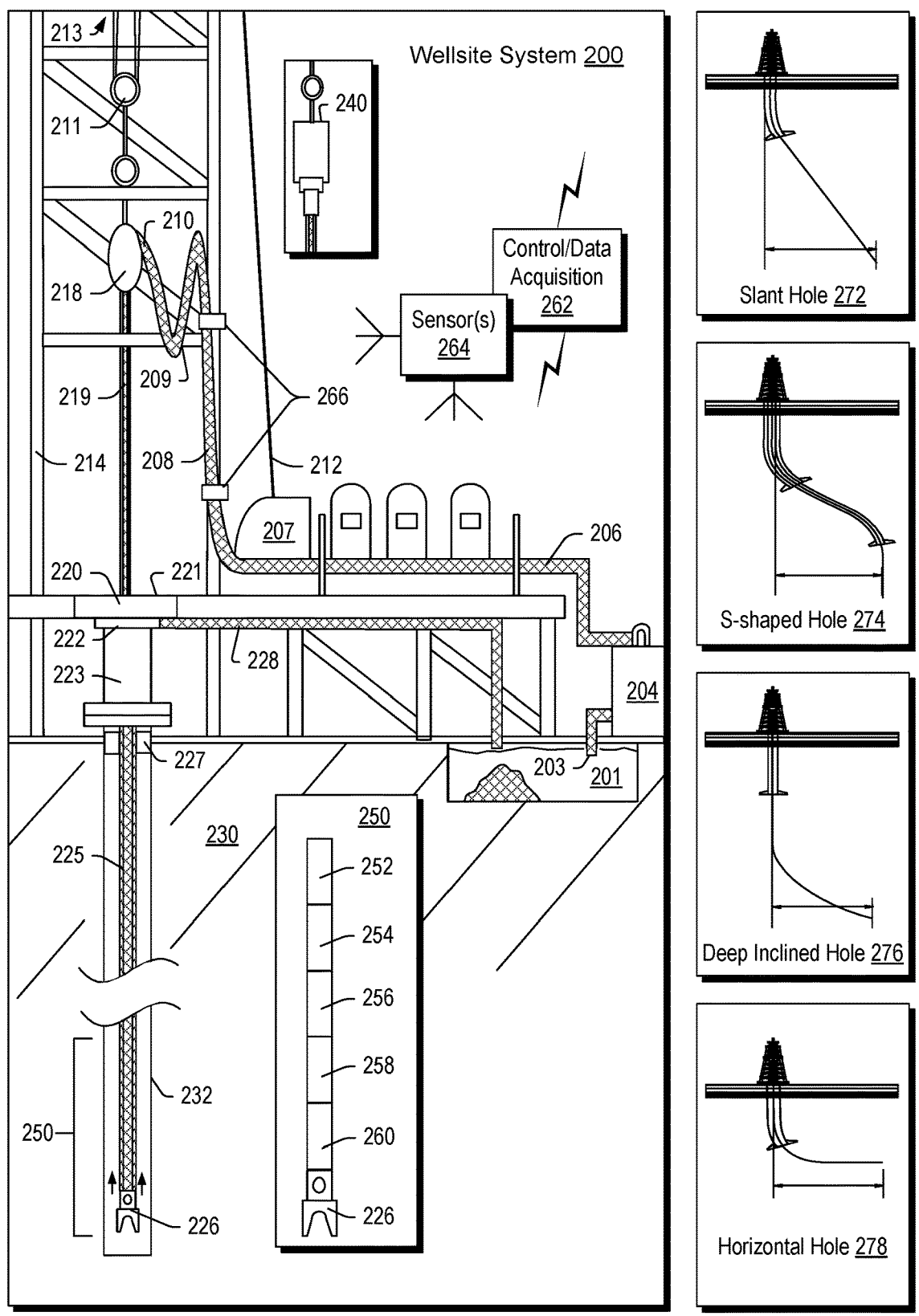
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (AND) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
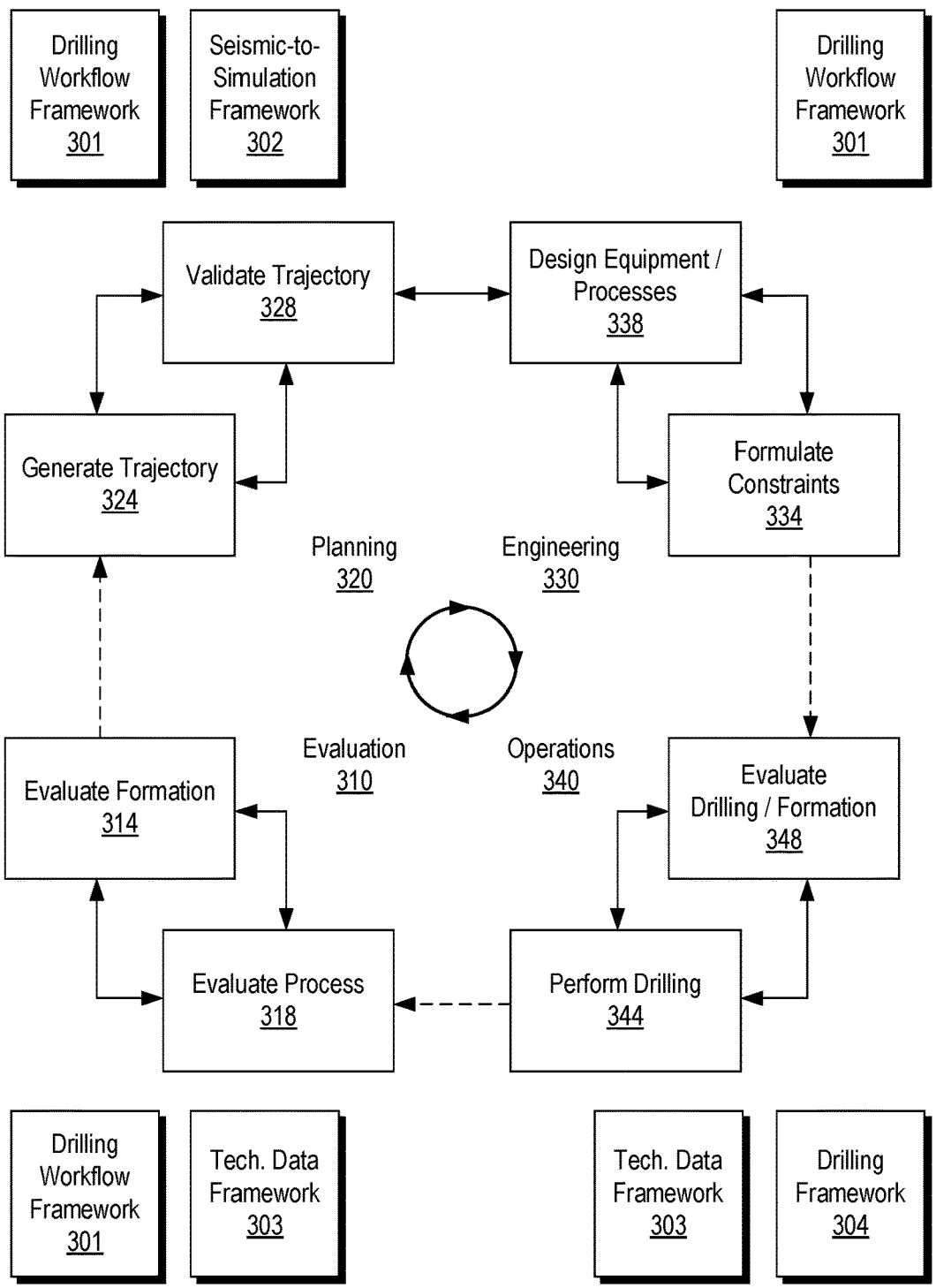
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Tex.) and the technical data framework 303 can be, for example, the TECHLOG® framework (Schlumberger Limited, Houston, Tex.).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. A commercially available example of an object-based framework is the MICROSOFT™ .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Tex.), the INTERSECT® reservoir simulator (Schlumberger Limited, Houston Tex.), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one another. As an example, consider the commercially available framework environment marketed as the OCEAN® framework environment (Schlumberger Limited, Houston, Tex.), which allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the commercially available OCEAN® framework where the model simulation layer can include or operatively link to the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA® framework, marketed by Schlumberger Limited, Houston, Tex.) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 4:
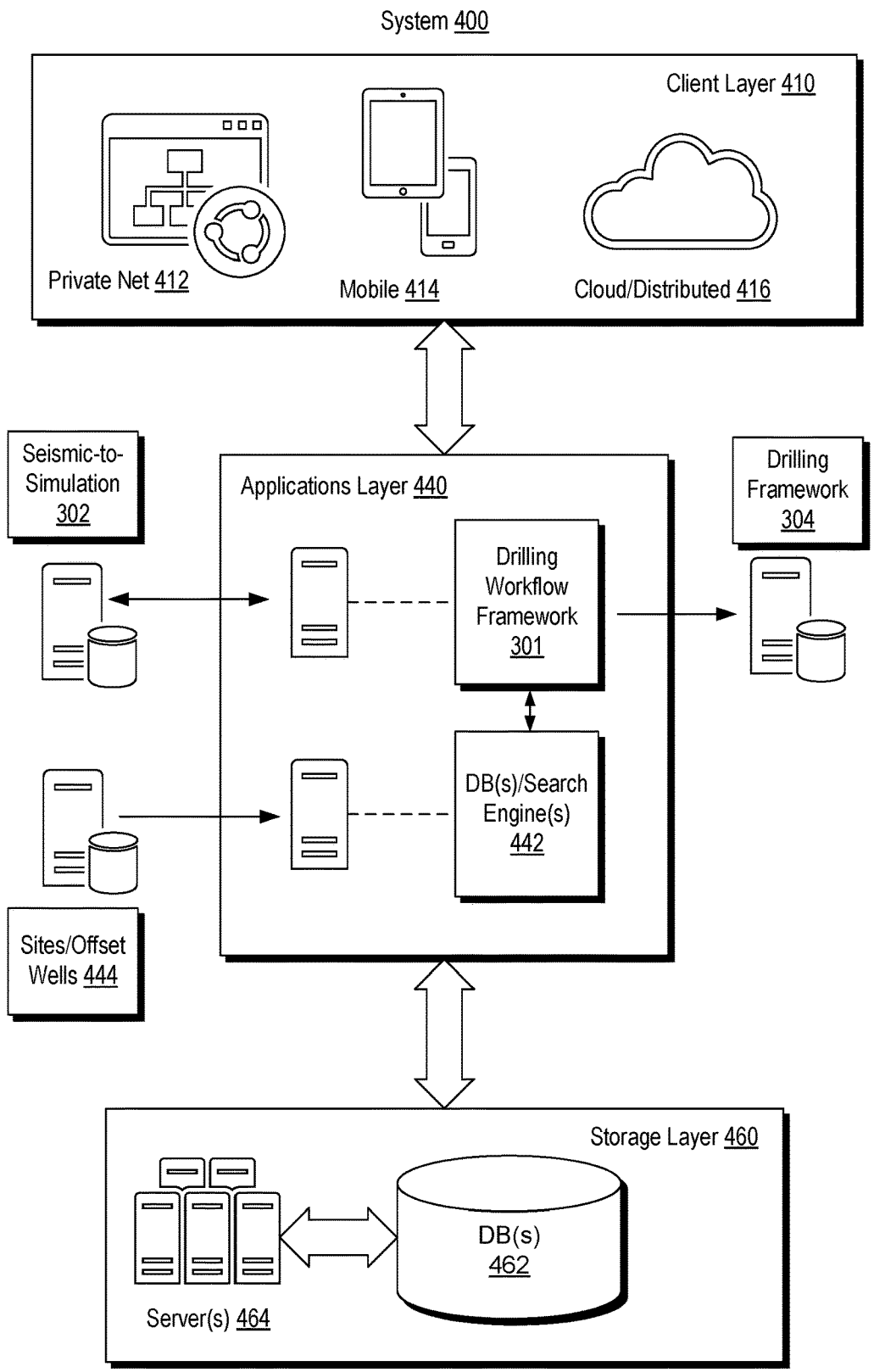
FIG. 4 illustrates an example of a system.

FIG. 4 shows an example of a system 400 that includes a client layer 410, an applications layer 440 and a storage layer 460. As shown the client layer 410 can be in communication with the applications layer 440 and the applications layer 440 can be in communication with the storage layer 460.

The client layer 410 can include features that allow for access and interactions via one or more private networks 412, one or more mobile platforms and/or mobile networks 414 and via the "cloud" 416, which may be considered to include distributed equipment that forms a network such as a network of networks.

In the example of FIG. 4, the applications layer 440 includes the drilling workflow framework 301 as mentioned with respect to the example of FIG. 3. The applications layer 440 also includes a database management component 442 that includes one or more search engines modules.

As an example, the database management component 442 can include one or more search engine modules that provide for searching one or more information that may be stored in one or more data repositories. As an example, the STUDIO E&P™ knowledge environment (Schlumberger Ltd., Houston, Tex.) includes STUDIO FIND™ search functionality, which provides a search engine. The STUDIO FIND™ search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND™ search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 4, the applications layer 440 can include communicating with one or more resources such as, for example, the seismic-to-simulation framework 302, the drilling framework 304 and/or one or more sites, which may be or include one or more offset wellsites. As an example, the applications layer 440 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 4, the storage layer 460 can include various types of data, information, etc., which may be stored in one or more databases 462. As an example, one or more servers 464 may provide for management, access, etc., to data, information, etc., stored in the one or more databases 462. As an example, the module 442 may provide for searching as to data, information, etc., stored in the one or more databases 462.

As an example, the module 442 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 400 of FIG. 4 may be implemented to perform one or more portions of one or more workflows associated with the system 300 of FIG. 3. For example, the drilling workflow framework 301 may interact with the technical data framework 303 and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

As an example, a method can include establishing an Internet of Things (IoT) hub or hubs. As an example, such a hub or hubs can include one or more device registries. In such an example, the hub or hubs may provide for storage of metadata associated with a device and, for example, a per-device authentication model. As an example, where location information indicates that a device (e.g., wellsite equipment, etc.) has been changed with respect to its location, a method can include revoking the device in a hub.

As an example, such an architecture utilized in a system may include features of the AZURE™ architecture (Microsoft Corporation, Redmond, Wash.). As an example, a cloud portal block can include one or more features of an AZURE™ portal that can manage, mediate, etc. access to one or more services, data, connections, networks, devices, etc.

As an example, a system can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 5:
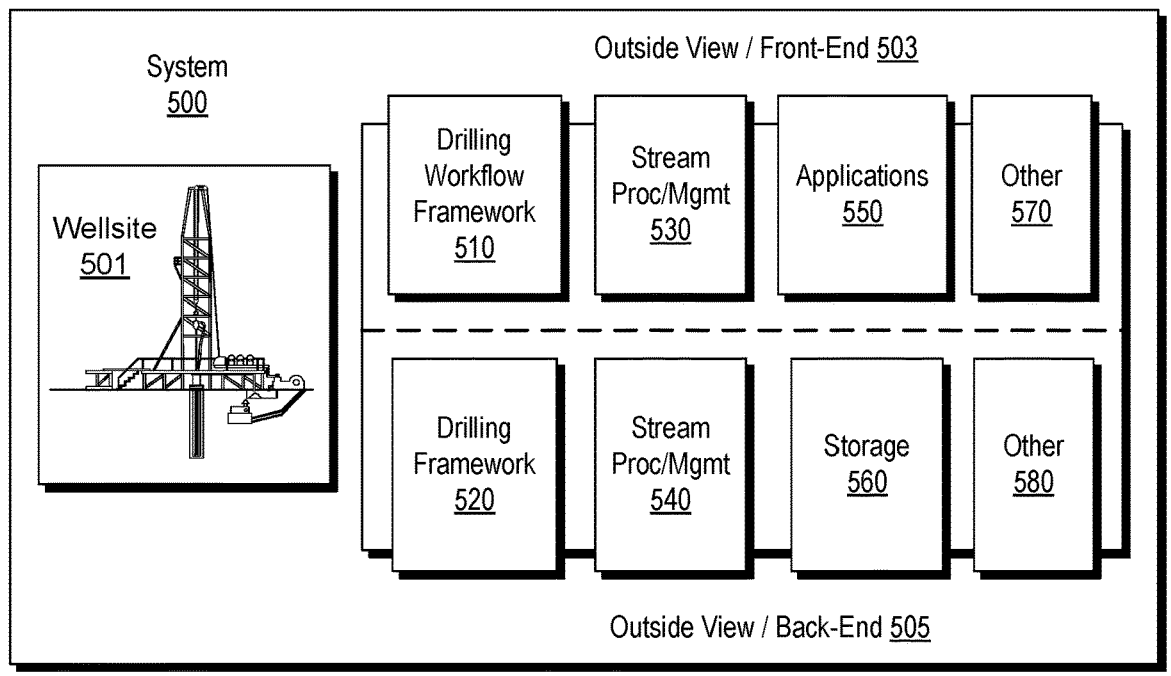
FIG. 5 illustrates an example of a system and an example of a scenario.
Figure 5:
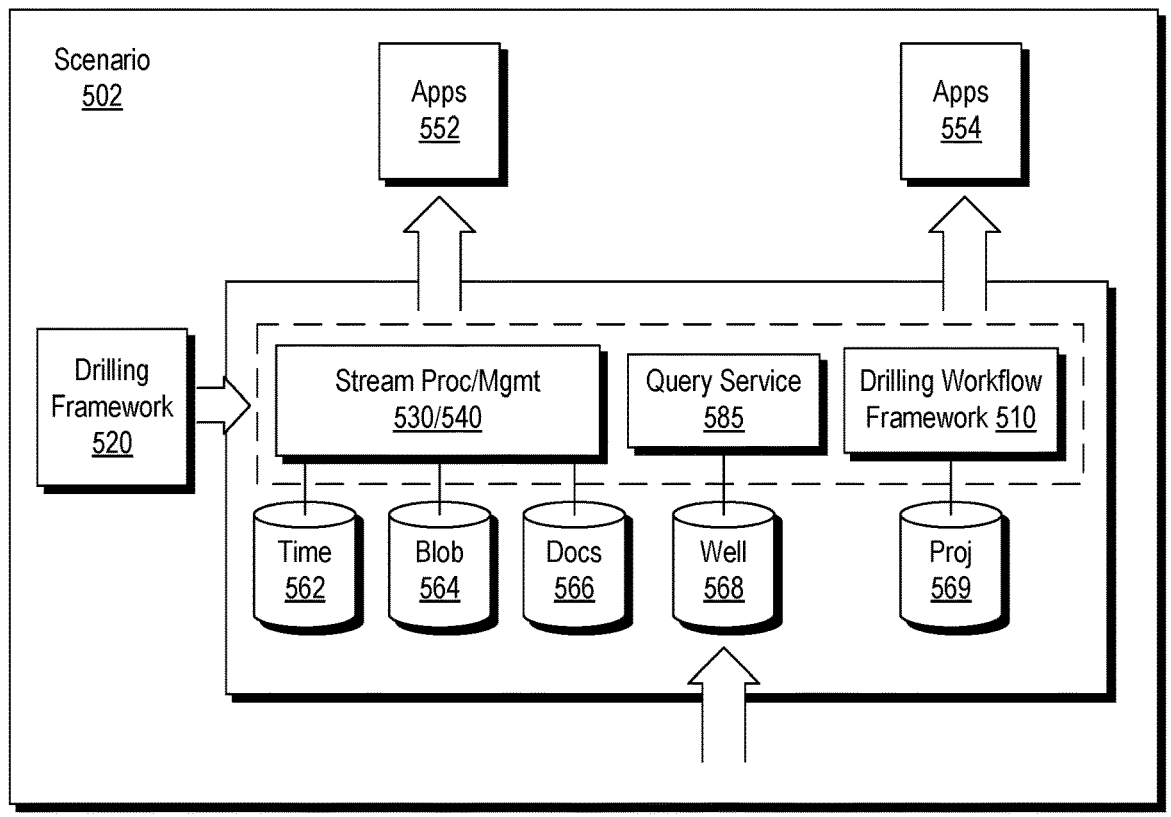

FIG. 5 shows an example of a system 500 associated with an example of a wellsite system 501 and also shows an example scenario 502. As shown in FIG. 5, the system 500 can include a front-end 503 and a back-end 505 from an outside or external perspective (e.g., external to the wellsite system 501, etc.). In the example of FIG. 5, the system 500 includes a drilling framework 520, a stream processing and/or management block 540, storage 560 and optionally one or more other features that can be defined as being back-end features. In the example of FIG. 5, the system 500 includes a drilling workflow framework 510, a stream processing and/or management block 530, applications 550 and optionally one or more other features that can be defined as being front-end features.

As an example, a user operating a user device can interact with the front-end 503 where the front-end 503 can interact with one or more features of the back-end 505. As an example, such interactions may be implemented via one or more networks, which may be associated with a cloud platform (e.g., cloud resources, etc.).

As to the example scenario 502, the drilling framework 520 can provide information associated with, for example, the wellsite system 501. As shown, the stream blocks 530 and 540, a query service 585 and the drilling workflow framework 510 may receive information and direct such information to storage, which may include a time series database 562, a blob storage database 564, a document database 566, a well information database 568, a project(s) database 569, etc. As an example, the well information database 568 may receive and store information such as, for example, customer information (e.g., from entities that may be owners of rights at a wellsite, service providers at a wellsite, etc.). As an example, the project database 569 can include information from a plurality of projects where a project may be, for example, a wellsite project.

As an example, the system 500 can be operable for a plurality of wellsite, which may include active and/or inactive wellsites and/or, for example, one or more planned wellsites. As an example, the system 500 can include various components of the system 300 of FIG. 3. As an example, the system 500 can include various components of the system 400 of FIG. 4. For example, the drilling workflow framework 510 can be a drilling workflow framework such as the drilling workflow framework 301 and/or, for example, the drilling framework 520 can be a drilling framework such as the drilling framework 304.

Figure 6:
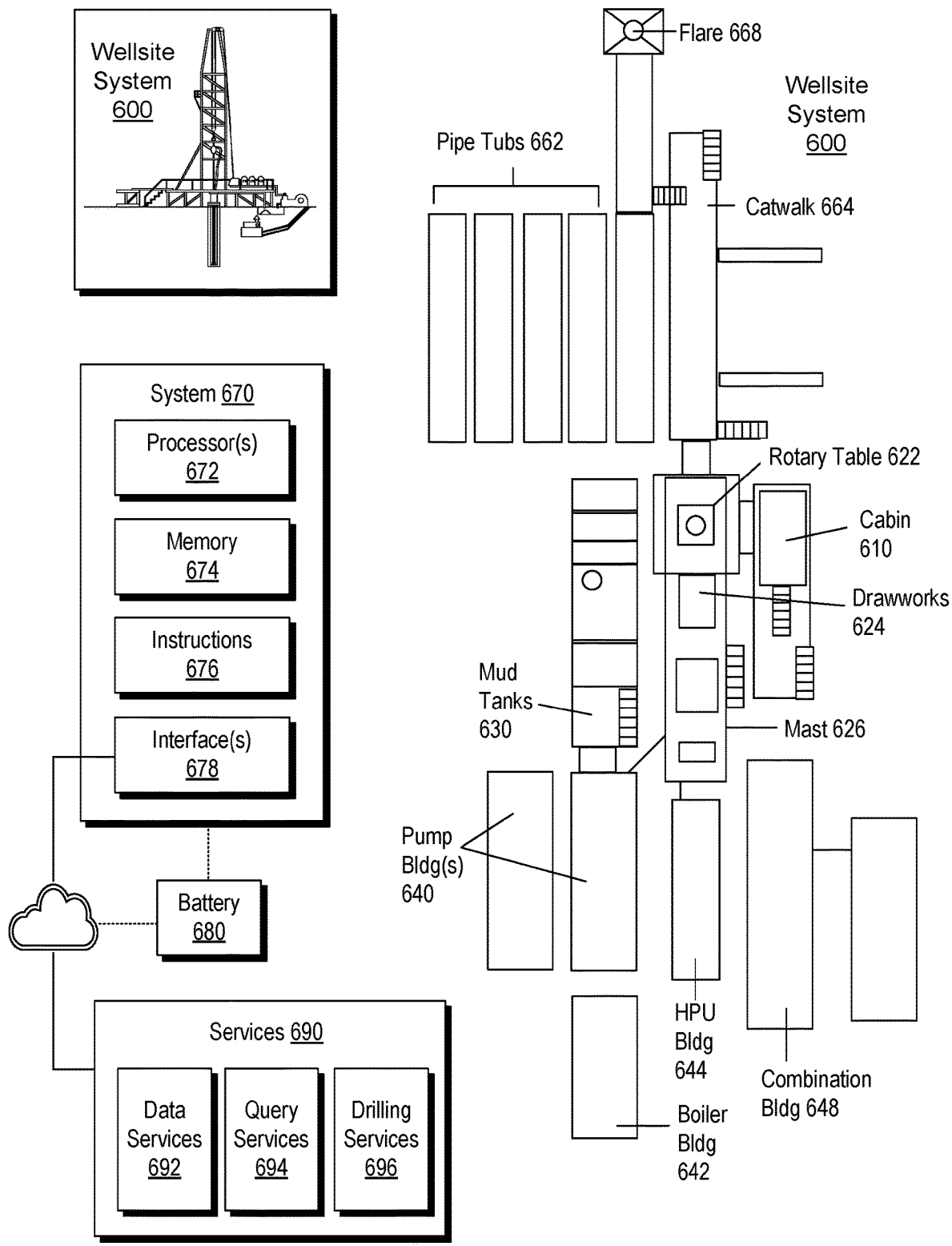
FIG. 6 illustrates an example of a wellsite system.

FIG. 6 shows an example of a wellsite system 600, specifically, FIG. 6 shows the wellsite system 600 in an approximate side view and an approximate plan view along with a block diagram of a system 670.

In the example of FIG. 6, the wellsite system 600 can include a cabin 610, a rotary table 622, drawworks 624, a mast 626 (e.g., optionally carrying a top drive, etc.), mud tanks 630 (e.g., with one or more pumps, one or more shakers, etc.), one or more pump buildings 640, a boiler building 642, an HPU building 644 (e.g., with a rig fuel tank, etc.), a combination building 648 (e.g., with one or more generators, etc.), pipe tubs 662, a catwalk 664, a flare 668, etc. Such equipment can include one or more associated functions and/or one or more associated operational risks, which may be risks as to time, resources, and/or humans.

As shown in the example of FIG. 6, the wellsite system 600 can include a system 670 that includes one or more processors 672, memory 674 operatively coupled to at least one of the one or more processors 672, instructions 676 that can be, for example, stored in the memory 674, and one or more interfaces 678. As an example, the system 670 can include one or more processor-readable media that include processor-executable instructions executable by at least one of the one or more processors 672 to cause the system 670 to control one or more aspects of the wellsite system 600. In such an example, the memory 674 can be or include the one or more processor-readable media where the processor-executable instructions can be or include instructions. As an example, a processor-readable medium can be a computer-readable storage medium that is not a signal and that is not a carrier wave.

FIG. 6 also shows a battery 680 that may be operatively coupled to the system 670, for example, to power the system 670. As an example, the battery 680 may be a back-up battery that operates when another power supply is unavailable for powering the system 670. As an example, the battery 680 may be operatively coupled to a network, which may be a cloud network. As an example, the battery 680 can include smart battery circuitry and may be operatively coupled to one or more pieces of equipment via a SMBus or other type of bus.

In the example of FIG. 6, services 690 are shown as being available, for example, via a cloud platform. Such services can include data services 692, query services 694 and drilling services 696. As an example, the services 690 may be part of a system such as the system 300 of FIG. 3, the system 400 of FIG. 4 and/or the system 500 of FIG. 5.

As an example, one or more systems can be utilized to implement a workflow that can be performed collaboratively. As an example, the system 300 of FIG. 3 can be operated as a distributed, collaborative well-planning system. The system 300 can utilize one or more servers, one or more client devices, etc. and may maintain one or more databases, data files, etc., which may be accessed and modified by one or more client devices, for example, using a web browser, remote terminal, etc. As an example, a client device may modify a database or data files on-the-fly, and/or may include "sandboxes" that may permit one or more client devices to modify at least a portion of a database or data files optionally off-line, for example, without affecting a database or data files seen by one or more other client devices. As an example, a client device that includes a sandbox may modify a database or data file after completing an activity in the sandbox.

In some examples, client devices and/or servers may be remote with respect to one another and/or may individually include two or more remote processing units. As an example, two systems can be "remote" with respect to one another if they are not physically proximate to one another; for example, two devices that are located at different sides of a room, in different rooms, in different buildings, in different cities, countries, etc. may be considered "remote" depending on the context. In some embodiments, two or more client devices may be proximate to one another, and/or one or more client devices and a server may be proximate to one another.

As an example, various aspects of a workflow may be completed automatically, may be partially automated, or may be completed manually, as by a human user interfacing with a software application. As an example, a workflow may be cyclic, and may include, as an example, four stages such as, for example, an evaluation stage (see, e.g., the evaluation equipment 310), a planning stage (see, e.g., the planning equipment 320), an engineering stage (see, e.g., the engineering equipment 330) and an execution stage (see, e.g., the operations equipment 340). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 314). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 324), which may involve execution of one or more G&G software packages. Examples of such software packages include the PETREL® framework. As an example, a G&G service provider may determine a well trajectory or a section thereof, based on, for example, one or more model(s) provided by a formation evaluation (e.g., per the evaluation block 314), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model (s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory (see, e.g., the design block 338). In some embodiments, a second engineering service provider may perform such design using one of more software applications. Such designs may be stored in one or more databases maintained by one or more servers, which may, for example, employ STUDIO® framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 334). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 318). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

As an example, an evaluator may be part of a system that can be implemented for evaluating a design or designs (e.g., in a collaborative workspace after one or more additions, modifications, deletions, etc. are made to a well plan). Changes to a well plan can result in one or more parameters for one or more other designs being changed, which may result in the one or more other designs being outside of one or more design parameter specifications. As an example, an evaluator may manage or resolve such discrepancies or "collisions" between designs posted to a collaborative workspace by different designers (e.g., via individual workspaces, etc.). As an example, a hierarchy may be established for individual design elements, e.g., based on role, expertise, credentials, qualifications, employee experience, etc. For example, an evaluator may then consider a collision and select a design submitted by a designer with a higher status in the hierarchy for that design activity.

Figure 7:
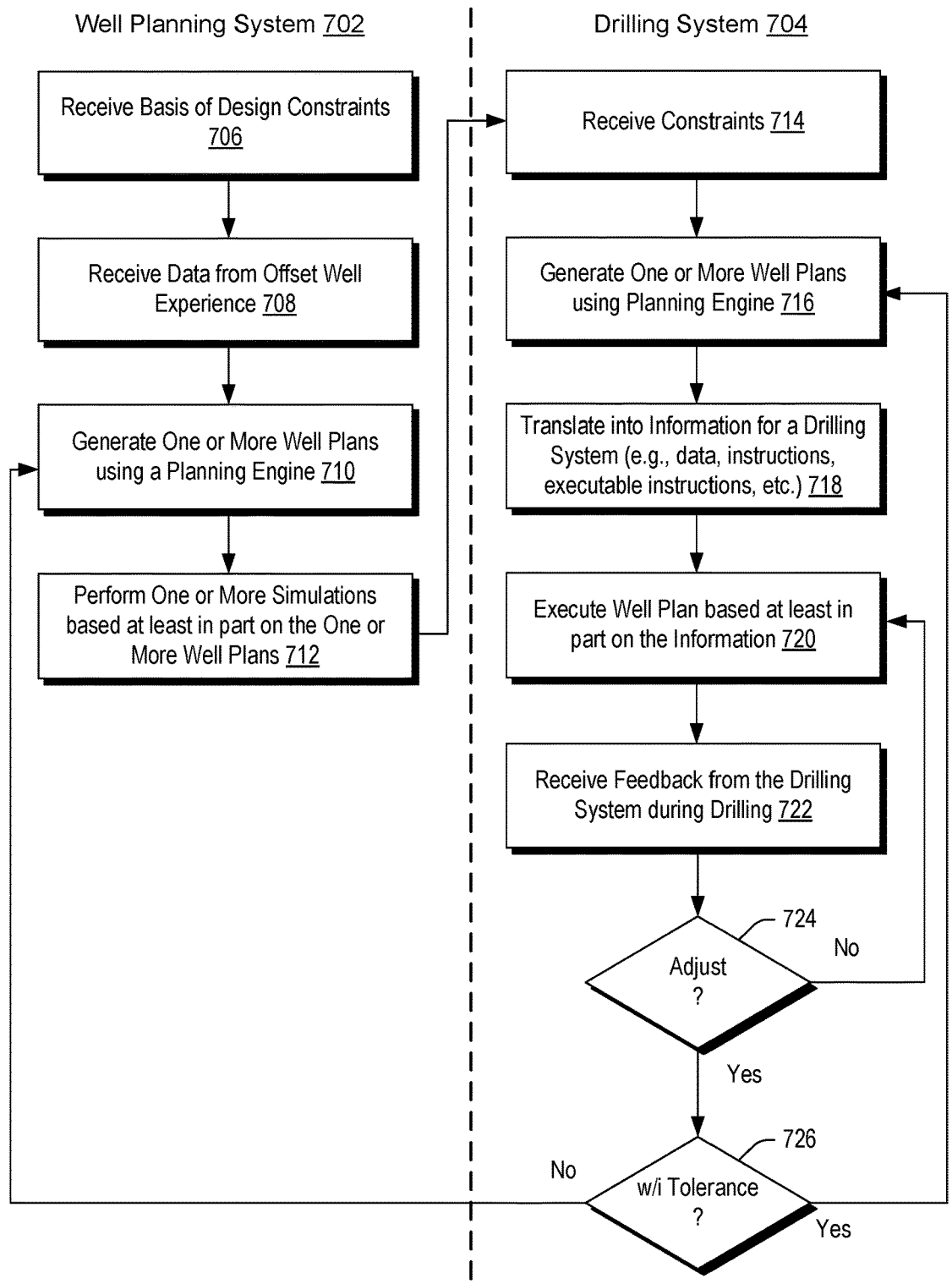
FIG. 7 illustrates an example of a method.

FIG. 7 shows an example of a method 700 for planning and drilling a well. The method 700 may include interactions between two (or more) computing systems, which may be operated by different users or a common user. As an example, the computing systems may be part of a single, overall computing system, whether local, remote, distributed, etc., or may be made up of two or more separate computers, e.g., operated by different entities.

In the example of FIG. 7, a well planning system 702 and a drilling system 704 are shown where various actions can occur using the well planning system 702, where various action can occur using the drilling system 704 and where interactions can occur between the system 702 and the system 704.

s an example, the well planning system 702 may include one or more computing devices, systems, etc., executing software configured to generate well plans. As an example, the drilling system 704 may include one or more computing devices, systems, etc., executing software configured to generate well plans. As an example, framework "engines" may be utilized to develop well plans in the two systems 702 and 704 where such framework engines may be instantiated versions of a common framework engine, such that, for example, given common input, common output is produced (e.g., a common well plan). However, where input differs in one of the system 702 and 704, the systems 702 and 704 may output a well plan that differs. As an example, a system may be provided with constraints, rather than completely specified well plans. For example, the system 702 or the system 704 may be provided with constraints as to one or more pieces of equipment, one or more procedures, etc.

In the example of FIG. 7, the method 700 includes a portion that operates according to the well planning system 702. For example, the method 700 can include a reception block 706 for receiving "basis of design" (BOD) constraints. In such an example, the basis of design constraints may include information about economics, risk tolerance, existence of nearby wells, and/or the like. Such BOD constraints may include a surface location for the well to begin and a target, subterranean location for the well to reach, such as a hydrocarbon reservoir. In such an example, the constraints for a well may be specified as points in a three-dimensional coordinate system that represents, for example, a geologic environment that includes a surface portion and a subterranean portion where the subterranean portion can include one or more reservoirs.

As shown in FIG. 7, the method 700 can include a reception block 708 for receiving data collected based on one or more nearby, offset wells. In such an example, these data may provide insight into geology, as well one or more other conditions related to the drilling, which may provide information as to, for example, kick-off depth where a vertical wellbore trajectory may transition to horizontal.

As an example, information received by the well planning system 702 may be utilized to develop a set of points through which a wellbore may extend (e.g., a trajectory specified at least in part according to points, which may be stored in a digital file). As shown, the method 700 includes a generation block 710 for generating one or more well plans. In such an example, the one or more well plans can be based at least in part on points, constraints, etc., which may be received by and processed by a well planning engine that can construct one or more well plans (e.g., or portions thereof, etc.).

As an example, a well planning engine may create one or more such plans that satisfy various constraints. As an example, a well planning engine may include a simulator that can perform one or more simulations based at least in part on one or more well plans, for example, to select one or more of the well plans for execution. As shown in the example of FIG. 7, the method 700 includes a performance block 712 for performing one or more simulations based at least in part on the one or more well plans as generated by the generation block 710.

As an example, a selected well plan or plans may be transmitted as a digital file or files (e.g., or as a printed hard copy of at least a portion of a plan or plans) to an entity such as, for example, a well owner. Where the entity (e.g., or entities) approve one or more well plans, the one or more approved well plans may be transmitted to the drilling system 704 where execution of such well plan or plans may commence. As an example, a portion of a well plan, portions of a well plan, portions of well plans, etc. may be transmitted. As an example, feedback from the drilling system 704 to the well planning system 702 may cause one or more revised portions to be generated by the well planning system 702 and transmitted to the drilling system 704.

As shown in the example of FIG. 7, the method 700 can include a portion that operates via the drilling system 704. As shown, the method 700 can include a reception block 714 for receiving well constraints (e.g., BOD constraints), which may be transmitted by the well planning system 702. As an example, well constraints can be information that is less than or that differs from a complete well plan. The drilling system 704 may operate on a reduced amount of information (e.g., BOD constraints rather than a complete well plan) where the drilling system 704 includes a well planning engine such as the well planning engine of the well planning system 702. In such an example, the drilling system 704 may generate a well plan (or plans) based on the constraints where such a well plan (or plans) may substantially match a well plan (or plans) generated by the well planning system 702. As an example, one or more well plans may be transmitted to and received by the drilling system 704 (e.g., as generated by the well planning system 702).

As an example, the well planning system 702 and the drilling system 704 may be remotely operated with respect to each other. For example, the well planning system 702 may be operated in a city office while the drilling system 704 may be operated in the field at a wellsite (see, e.g., the system 670 of FIG. 6). As an example, the well planning system 702 may be part of a drilling workflow framework (see, e.g., the drilling workflow frameworks 301 and 510) while the drilling system 704 may be part of a drilling framework (see, e.g., the drilling frameworks 304 and 520).

Referring again to the method 700 of FIG. 7, the method 700 can include a generation block 716 for generating one or more well plans using a well planning engine. In such an example, the well planning engine can be an application that can be executed in an operating system (OS) environment established via a processor or processors and memory of a computing device or computing system. In such an example, the drilling system 704 can instantiate the application (e.g., execute the application) where the application may be identified by a version number where that version number of the application is utilized by the well planning system 702. (e.g., as may be instantiated by the well planning system 702).

As an example, the drilling system 704 can receive information from the well planning system 702 (e.g., directly and/or indirectly) where such information may be in the form of a digital file, a digital data stream, etc. In such an example, the drilling system 702 may direct such information and/or parse such information and provide it as input to the well planning engine to generate one or more well plans, per the generation block 716.

As shown in the example of FIG. 7, the method 700 can include a translation block 718 for translating at least a portion of one or more well plans into information for the drilling system 704. For example, such information can be text, numbers, graphics, digital data, digital commands, executable instructions, etc. As an example, such information may prescribe one or more operating parameters such as weight on bit, steering parameters, time, depth, tubular size, etc. to be employed, and may prescribe an order in which they are employed.

As shown in the example of FIG. 7, the method 700 can include an execution block 720 for executing at least a portion of a well plan based on the information. As an example, the drilling system 704 can be a wellsite system that includes drilling equipment, which may be proximal to one or more computing devices, systems, etc. of the drilling system 704 (e.g., or remote therefrom). As an example, the drilling system 704 may, for example, be at least in part computer-controllable, so as to follow instructions and thus at least a corresponding portion of a well plan.

As an example, during execution of at least a portion of a well plan per the block 720, the method 700 can include a reception block 722 for receiving feedback from the drilling system 704 (e.g., one or more pieces of wellsite equipment, surveillance equipment, etc.).

As an example, feedback can include information of well logs, drilling logs, core samples, gas chromatography, etc. As an example, feedback can include information of operating conditions of one or more pieces of equipment. As an example, feedback can include information as to pipe sticking, cuttings in drilling fluid, temperature, pressure, etc.

As shown in the example of FIG. 7, the method 700 can include a decision block 724 for deciding whether to adjust one or more portions of a well plan based at least in part on feedback per the reception block 722. For example, the drilling system 704 may compare the feedback to information known from one or more offset wells, seismic data, etc., so as to determine whether the drilling is likely to proceed as expected, e.g., using the same force levels, drilling time, etc., as predicted in the well plan. If not, the method 700 may include adjusting the well plan based on the feedback (e.g., decision branch "Yes" of the decision block 724). Otherwise, the method 700 may proceed to the execution block 720 in a loop (e.g., decision branch "No" of the decision block 724). In the latter instance, the method 700 can include continuing to execute at least a portion of the well plan (e.g., conduct drilling operations, etc.).

As shown in the example of FIG. 7, where the decision block 724 proceeds via the "Yes" branch, the method 700 can include another decision block 726 for deciding whether an adjustment contemplated is within one or more tolerances. As shown, where an adjustment is outside of a predetermined tolerance (e.g., threshold, etc.), the method 700 may continue to the generation block 710 of the well planning system 702 to generate one or more well plans that can be assessed, for example, via simulation per the performance block 712. And where an adjustment is deemed to be within one or more tolerances by the decision block 726, the method 700 may continue to the generation block 716 of the drilling system 704.

As an example, a threshold or thresholds (e.g., tolerance or tolerances, etc.) may differ depending on the type of parameter being adjusted. For example, specific thresholds may be set for a distance that the well may miss a point, a dog-leg severity maximum, various forces on the casing, bottom-hole assembly, etc. Accordingly, when an adjustment is considered, it may be weighed against the appropriate threshold. In some cases, the threshold adjustment may be zero, e.g., if an adjustment is called for, it is deemed to be out of range.

As mentioned, where the decision block 726 proceed to the "No" branch, (e.g., adjustment is out of range, etc.), a new well may be planned and/or presented to the well owner for approval. In such an example, the method 700 may proceed back to generating one or more well plans in the well planning system 702 at the generation block 710 (e.g., or another block). Such new well plan or plans may take into consideration one or more adjusted constraints, as provided by the feedback per the reception block 722. As mentioned, the method 700 may return to generating one or more well plans using the well planning engine executing on the drilling system 704 per the generation block 716. As an example, a new well plan generated by the drilling system 704 may take into consideration one or more real-world forms of feedback to make an adjustment or adjustments as may be decided and/or determined by the block 724.

Figure 8:
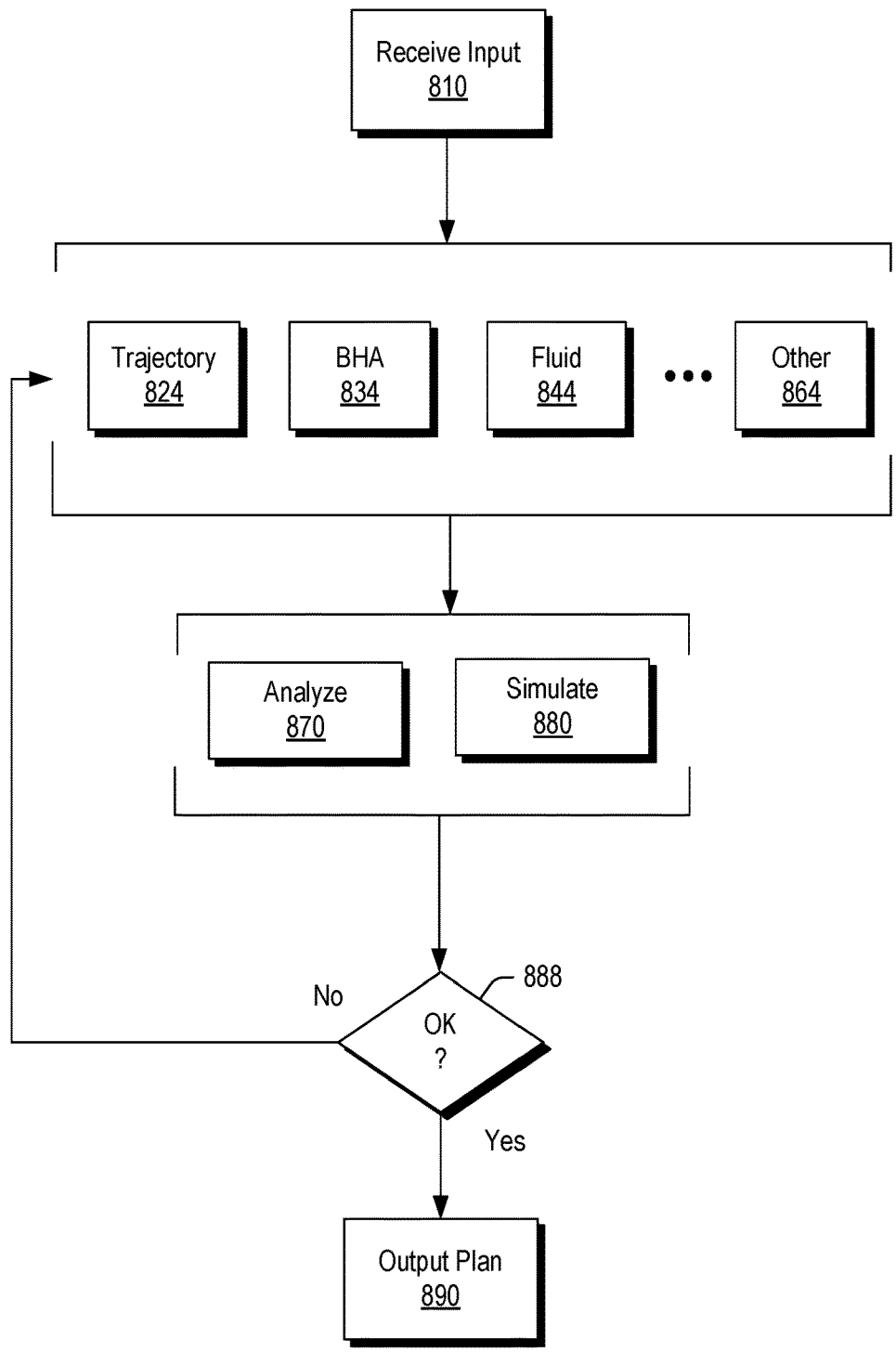
FIG. 8 illustrates an example of a method.

FIG. 8 shows an example of a method 800 that can be implemented, for example, by a well design system, to output a well plan. As an example, such a well plan may be in digital form, in paper form or in digital and paper form. As an example, a well engineering application may assist a user in designing a well and, for example, may specify various pieces of equipment that may be used to construct the well. As part of a method, specifications may be reviewed, for example, to build confidence that the well may be safely and successfully drilled. As an example, the method 800 may be performed at least in part via a drilling workflow framework such as the framework 301 of the system 300 or, for example, as shown in the applications layer 440 of the system 400 or, for example, the drilling workflow framework 510 as shown in the front-end 503 of the system 500.

As shown in the example of FIG. 8, the method 800 includes a reception block 810 for receiving information such as tolerances, offset well information, historical information, drilling equipment specifications, etc. The information received can be utilized by a plurality of design blocks 824, 834, 844 and 864 that can output design information (e.g., design parameters) for analysis by an analysis block 870 and/or for simulation by a simulation block 880 that can simulate drilling activity. Output from the block 870 and/or the block 880 may be assessed by a decision block 888 that can decide whether the design parameters that make up a well plan are acceptable or not. For example, where one or more of the design parameters are unacceptable, the method 800 can continue to one or more of the design blocks 824, 834, 844 and 864 (e.g., a design block layer); whereas, where the design parameters are acceptable, the method 800 can continue to an output block 890 that can output a well plan that includes, for example, a well trajectory, equipment information and one or more activities that are to be performed.

As an example, a well plan may not explicitly specify each activity of each worker. For example, a drilling engineer may not explicitly specify each activity or drilling parameter to be followed during execution of a well plan.

As an example, a drilling engineer can create a design, and may, in some cases, not create a set of instructions for achieving the design. For example, a drilling engineer may assume that a driller is able to follow the design and drill a well matching the design.

While designing the well, a drilling engineer might make assumptions about the capabilities and/or behaviors of a driller and of equipment that may be used. These assumptions may influence the design. For example, a drilling engineer may assume that a driller is likely to kick off at about 200 feet higher than prescribed in the design. Therefore, the drilling engineer may specify the kick off point to be about 200 feet lower such that when the driller deviates from the design, the kick off point will be where the drilling engineer intended the kick off to be located.

As an example, a drilling workflow framework may be implemented to output a well plan or a portion thereof in a manner that accounts for human behavior and/or equipment to be utilized at a wellsite.

As an example, a driller may commence drilling activities according to a well plan. In such an example, the driller may periodically make adjustments to equipment in an effort to drill a bore that follows a trajectory specified in the well plan, which may be specified via points and other information. In such an example, it may be desirable that the driller may make adjustments according to increments based on progress (e.g., position along a trajectory) and/or time (e.g., increments of about 30 seconds, etc.). However, a driller may not act in such a rigid manner.

As an example, a drilling engineer may create a well plan that can account for driller behavior such as how often a driller is likely to reference a well plan and make an adjustment according to the well plan. A source of such behavior may be related to skills (e.g., level of experience) ability to multi-task, etc.

As an example, a drilling workflow framework can be utilized to output a well plan that includes one or more levels of detail. As an example, a drilling workflow framework may output a well plan that includes a second-by-second listing of instructions, that includes a minute-by-minute listing of instructions, or that includes a more coarse listing of instructions. As an example, a well plan may include a mixture of finely listed and coarsely listed instructions. In such an example, coarsely listed instructions may be specified in a well plan based at least in part on knowledge of driller behavior. In such a manner, the well plan may match driller behavior, for example, how often a driller is likely to reference and/or follow instructions.

As an example, a coarse listing of instructions may state: drill vertical for 3,000 feet; start turning at a constant rate of turning; after turning through 30 degrees, then . . . . Such a plan may be relatively simple and may increase the likelihood of the drilling executing each instruction of the plan. Thus, a well plan may be designed with an aim to increase its likelihood of being executed, for example, instruction-by-instruction. Such a well plan may be less than optimal in one or more other aspects (e.g., cost, certain types of risk, etc.) where precedence is given to likelihood of driller execution. Such a well plan may be the "best" plan that a driller is likely to drill. As an example, such a well plan may be a digital well plan, a paper well plan or a digital and paper well plan. As an example, as a digital well plan, it may be rendered to a display as part of a graphical user interface. In such an example, the instructions may be scrollable (e.g., navigable) by an input mechanism of a computing device (e.g., a touchscreen, a mouse, a microphone for voice commands, etc.). As an example, a well plan may be audible such that a speaker announces instructions to a driller (e.g., in a cabin, etc.).

As an example, a well plan can include digital information that may be loaded into a drilling framework that is operatively coupled to one or more pieces of equipment at a wellsite. In such an example, the drilling framework may optionally automate one or more actions of wellsite equipment. Such an approach may allow a driller to focus on a set of instructions that the driller is expected to follow. As an example, a drilling framework may track operations executed by a driller and record information associated therewith, for example, to form a drilling report that indicates whether and/or to what degree a driller executed instructions and, for example, what actions the drilling framework may have undertaken.

As an example, a well plan can be generated that can be executed in part by a machine or machines and, for example, that can be executed in part by a human (e.g., a driller). As an example, a drilling framework operatively coupled to wellsite equipment may assess capabilities locally at the wellsite and then determine how to present and/or actuate the well plan to perform drilling operations. As an example, such an approach may assess capabilities of one or more humans that may be at the wellsite (e.g., at one or more times). As an example, drilling can occur via human control, machine control or via hybrid control (e.g., part human and part machine).

As to human control, a printed well plan (e.g., paper plan) may be provided to a driller. In such an example, the driller can maintain a log of information, which may be paper and/or digital.

As to machine control, a digital well plan may be received (e.g., loaded) to one or more automation controllers of wellsite equipment. In such an example, information as to execution of instructions may be recorded and stored as a log, which may be printable or otherwise presentable (e.g., renderable to a display, etc.) for purposes of review.

Figure 9:
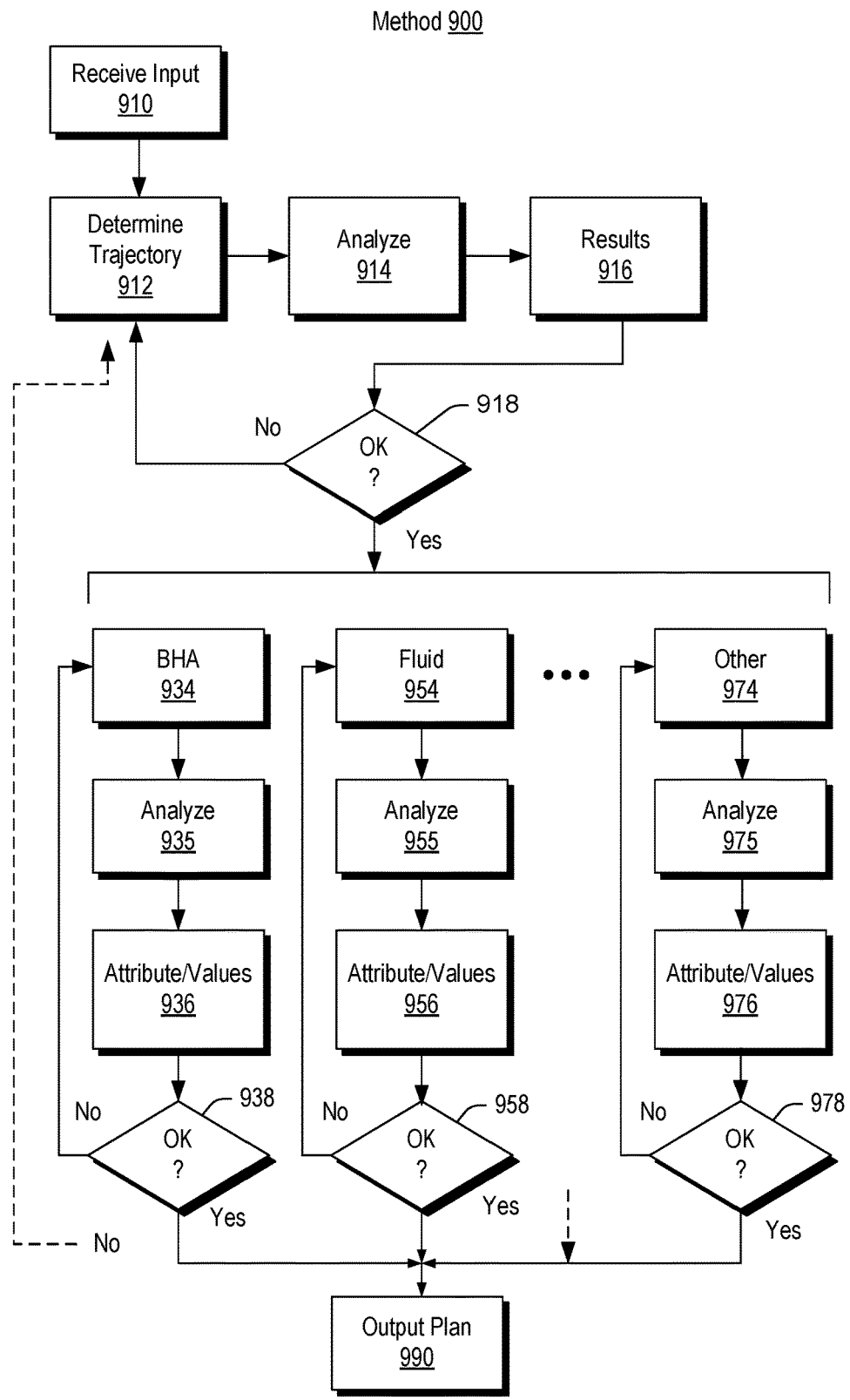
FIG. 9 illustrates an example of a method.

FIG. 9 shows an example of a method 900 for outputting a well plan. In such an example, the well plan may be for a well design that can be drilled at least in part by an automated system. As an example, an automated drilling system may include characteristics that differ from a human driller. For example, a system can attempt to drill the design, without changing the design; the system can accept instructions, whereas a human driller may make some decisions about how the well is to be drilled; and the system can have an ability to handle a very fine-grained level of design, control and information (e.g., a level that may overwhelm a human driller).

As an example, a method can benefit from an understanding of differences between machine and human behaviors and/or capabilities in a manner that can allow a drilling engineer to create a detailed drilling plan that includes a well design suited, at least in part, for automated drilling.

In the example of FIG. 9, the method 900 can be implemented to output a plan such as, for example, a well plan. As shown, the method 900 includes an input block 910 for inputting information such as design specifications, desired features, etc. In such an example, the information can include information about automation equipment, information about human behavior and/or skill levels, etc. As an example, input information may include information as to degree of automation desired or not desired. For example, input information can include a list of tasks that are to be performed by a human driller and a list of tasks that are to be performed by equipment (e.g., under computer control, etc.).

As shown in the example of FIG. 9, the method 900 includes a determination block 912 for determining a trajectory for a well as part of a well plan, an analysis block 914 for analyzing the trajectory, a results block 916 for outputting results of the analyzing and a decision block 918 for deciding if the trajectory is acceptable (e.g., OK or not OK). Where the decision block 918 decides that the determined trajectory is not OK, the method 900 continues to the determination block 912, for example, to re-determine a trajectory. However, where the decision block 918 decides that the trajectory is OK, the method 900 continues to a series of individual blocks where each series of blocks pertains to a particular aspect of a well plan as associated at least in part with a trajectory, which, in the example of FIG. 9, is the OK trajectory per the decision block 918.

In the example of FIG. 9, various blocks can form loops. For example, as shown, a BHA block 934 can commence a process that includes an analysis block 934 for analyzing the trajectory as associated with BHA information and an attribute/values block 936 for outputting various BHA associated attributes and/or values for a BHA. As shown, a decision block 938 can decide whether the attributes and/or values are acceptable (e.g., OK or not OK). Where the decision block 938 decides that the attributes and/or values are acceptable, the BHA portion (e.g., BHA subsystem) may be deemed to be acceptable for inclusion in a plan 990 (e.g., a well plan).

In the example of FIG. 9, attributes, values, etc. can be design parameters. For example, an attribute can be a design parameter, a value can be a design parameter, etc. As an example, the method 900 of FIG. 9 may be implemented at least in part via a system such as, for example, the system 300 of FIG. 3, the system 400 of FIG. 4, etc.

As also shown in FIG. 9, a fluid block 954 can commence a process that includes an analysis block 954 for analyzing the trajectory as associated with fluid and/or formation information and an attribute/values block 956 for outputting various fluid associated attributes and/or values for fluid (e.g., mud, etc.). As shown, a decision block 958 can decide whether the attributes and/or values are acceptable (e.g., OK or not OK). Where the decision block 958 decides that the attributes and/or values are acceptable, the fluid portion (e.g., drilling fluid subsystem) may be deemed to be acceptable for inclusion in a plan 990 (e.g., a well plan).

As also shown in FIG. 9, an other block 974 can commence a process that includes an analysis block 974 for analyzing the trajectory as associated with subsystem information and an attribute/values block 976 for outputting various subsystem associated attributes and/or values for the particular subsystem. As shown, a decision block 978 can decide whether the attributes and/or values are acceptable (e.g., OK or not OK). Where the decision block 978 decides that the attributes and/or values are acceptable, the subsystem may be deemed to be acceptable for inclusion in a plan 990 (e.g., a well plan).

In the example of FIG. 9, the BHA loop can return to the BHA block 934, the fluid loop can return to the fluid block 954 and the other loop can return to the other block 974. As an example, where one or more of these loops does not pass its corresponding the decision block, the method 900 may return to the determination block 912.

As an example, the method 900 of FIG. 9 may be implemented in a manner for direct control of objective attributes. For example, the method 900 can be implemented for designing a well plan starting with a geometric trajectory design per the determination block 914. In such an example, a designer may utilize an individual workspace to manipulate a geometry of the trajectory and chart its path through three dimensional space. In such an example, tools employed may directly or indirectly allow the designer to impose geometric constraints or objectives.

As an example, there may exist constraints for the path to pass though specific points, areas or volumes; or for the curvature of the path to fall below a specified value. Controls provided to a designer may be geometric in nature.

As an example, provided an acceptable geometric trajectory design per the decision block 918, the method 900 can include analyzing various subsystems to determine whether the trajectory design can satisfies additional objectives. As an example, additional objectives may include, for example: will the design allow adequate hole cleaning; will the drilling apparatus undergo acceptable stress levels during the drilling operation; will the wellbore allow the passage of wireline logging tools to perform desired measurements and services; etc.

As an example, the method 900 of FIG. 9 can include receiving conditions from a customer or one or more other sources. For example, consider a broad variety of information such as the location of a well head, geological target(s), geological context, geomechanical rock properties, available drilling equipment, specifications of the drilling rig, etc.

As an example, a partial description of the drilling system that may be used to drill the well may then be created. The capabilities of an overall drilling system may be less than the capabilities of a control system. For example, a control system may be able to send commands to the bottom hole assembly (BHA) on a minute-by-minute basis, but the particular BHA used may be able to change its configuration every five minutes. Such a scenario may limit the overall capability of the system to change BHA settings no more frequently than every five minutes.

As an example, a human driller may be considered and modeled as a "control system". The input description may partially describe an overall drilling system, because the design and planning process may specify various components that are part of the system. For example, an input description might include details about the drilling rig, but not about the drill bit.

As an example, a workflow can include creating one or more designs for the various components. An overall system may be analyzed and at least a portion of a drilling operation may be simulated. Such actions can result in having a description of various activities involved in drilling a well.

These activities may include, for example, a sequence of activities, and parameters describing the activities, such as the planned weight-on-bit, rotation rate (revolutions per minute (RPM)), and/or mud weight.

As an example, a workflow may include evaluating a proposed design, analysis and simulation results against a variety of criteria that might include the initial requirements, best practices, financial objectives or risk. If the design does not pass the evaluation, revisions may be made to the designs or specifications.

As an example, a workflow can include creating a well plan. Creating a well plan may include providing the design for the well, including the trajectory. Creating the well plan may also include providing the specifications for various components that make up the well, such as the casing points and types of casing. Creating the well plan may further include specifying or considering the equipment that will be used to drill the well, such as the BHA, the drill bits, and the drilling fluid. Creating the well plan may additionally include specifying activities that may be performed to create the well.

Evaluation criteria and designs, specifications and activities may be different in the case where a well will be drilled using an automated system from those in the case where the well is drilled by a human operator. Specific examples of differences include automated activities may call for frequent changes to drilling parameters, the trajectory may need frequent changes to drilling parameters, and the plan may be at the technical limits of what is possible, depending on the automated drilling system to quickly identify problems or deviations and take corrective action (faster or better than a human driller could do).

Additionally, the drilling system may not have an automated control system. A human driller might control the drilling. In this case, the description of the drilling system may describe the capabilities and willingness of the human driller to perform specific activities. (e.g., the human driller may only be willing to change BHA configurations once an hour).

Figure 10:
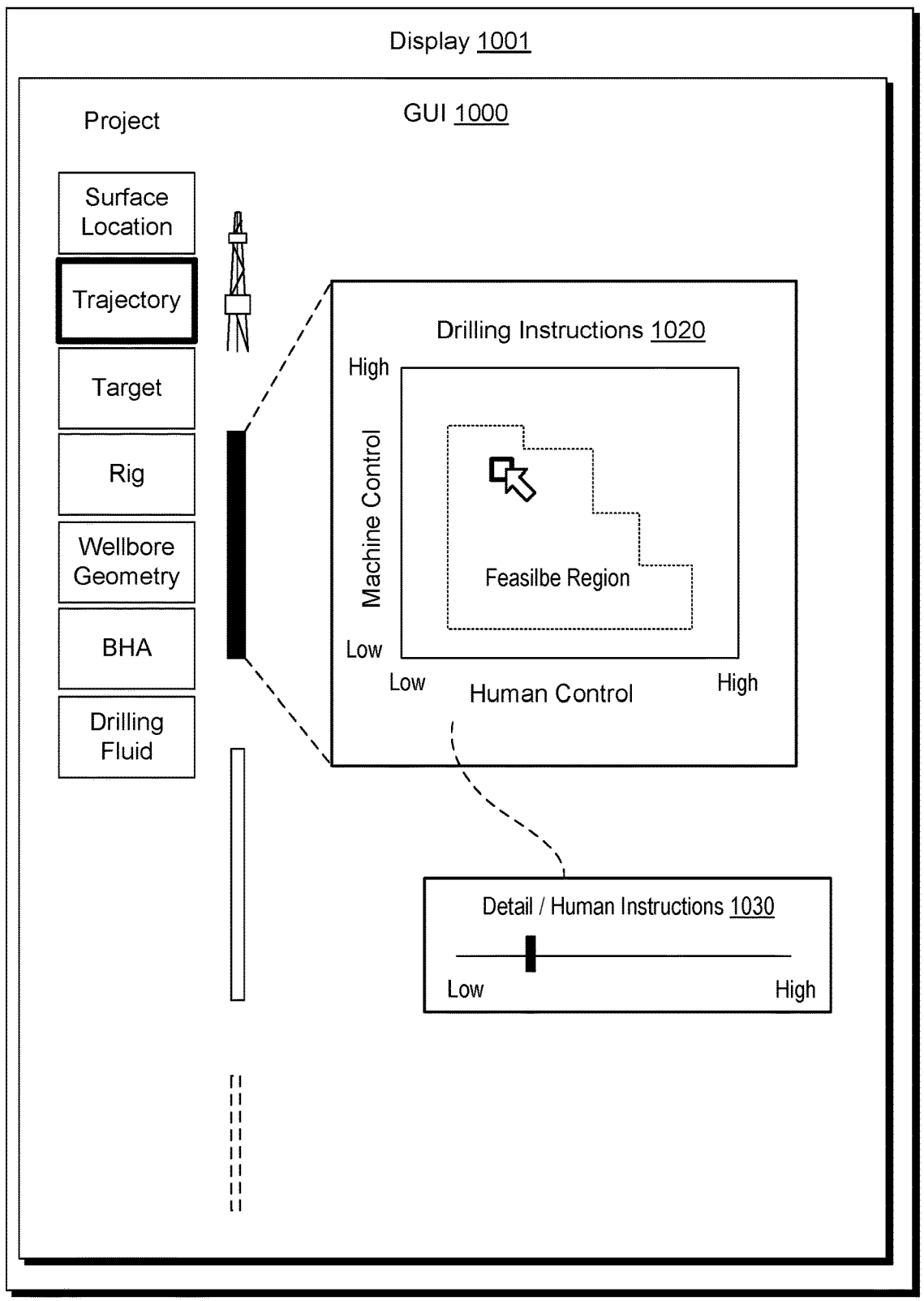
FIG. 10 illustrates an example of a graphical user interface.

FIG. 10 shows an example of a graphical user interface 1000 that is rendered to a display 1001 that can be part of a drilling workflow framework implemented by at least one computing device. As shown, the GUI 1000 includes various graphical elements that can correspond to one or more aspects of a well plan. As an example, consider selection of the trajectory and a portion of the trajectory, which may be highlighted in the GUI 1000. In such an example, the GUI 1000 can include a graphical element that can be a graphical control 1020 that pertains to drilling instructions to be part of a well plan.

In the example of FIG. 10, the graphical control 1020 shows a plot of machine control versus human control along spectra of low to high. In such an example, based at least in part on received information, a feasible region may be rendered to the plot. As an example, a user may utilize one or more input mechanisms to select a point, a region, etc. for purposes of generating at least a portion of a well plan. For example, a user may touch a touchscreen, move a mouse, etc. to select a point, a region, etc. that can indicate a desired level of machine control and/or human control.

In the example of FIG. 10, a box represents a selected region in the feasible region where machine control is toward the high end of the spectrum and where human control is toward the low end of the spectrum. Such a selection can correspond to wellsite equipment that includes automation equipment as well as a driller cabin where a driller can control one or more aspects of a drilling process to drill the indicated portion of the trajectory of a well.

As an example, where human drilling is to be performed (e.g., at least in part), a GUI can include an option to select a level of detail as to the drilling instructions for the human driller. For example, the GUI 1000 includes a graphical control 1030 that presents a slider tool for selecting a point along a spectrum from low to high as to level of detail of human instructions for at least a portion of a well plan (e.g., for the trajectory portion indicated, etc.). As an example, a level of detail may be set by default, in response to a selection on the machine/human spectra matrix, etc. As an example, where the graphical control 1030 is rendered to a display, it may indicate a recommended level of detail, which a user may optionally override. For example, where a user has knowledge of a driller, driller behavior, equipment, etc., a user may select a desired level of detail. As an example, a selected level of detail may be limited by an amount of automation where, for example, a higher level of automation may allow for a lower level of detail for human instructions in a well plan, a portion of a well plan, etc.

As an example, a workflow can include performing various actions associated with well planning (e.g., planning a well). For example, consider actions associated with planning a well trajectory. As an example, a system can include instructions that are executable to render one or more graphical user interfaces (GUIs) to a display where such one or more GUIs can be utilized to interact with the system for well planning. In such an example, a view may change responsive to selection of a graphical element of a GUI where such a selection may cause a local application and/or a remote application to change the view. A change in a view can include rendering one or more graphical elements, which may include graphical controls, graphical alerts, etc. As an example, a workflow may be guided by views of a plurality of graphical user interfaces where the workflow may be performed by one or more individuals, for example, at least in part in series, optionally at least in part in parallel, etc.

As an example, a method can include rendering one or more well paths to a display. A 2D or 3D rendering of the well paths may be presented to a user. As an example, one or more wells may be drilled in the reservoir based on the generated well path(s).

As an example, a method can include outputting at least one well trajectory where such a well trajectory may be output as a well plan, for example, in digital form. In such an example, a system such as, for example, the system 670 of FIG. 6 may be operated at least in part based on such a well plan. For example, a well plan may be in digital form and received by the drilling services 696 and utilized to instruct, control, guide, etc. one or more actions at a wellsite that includes wellsite equipment for drilling at least a portion of a bore (e.g., a wellbore, etc.).

Figure 11:
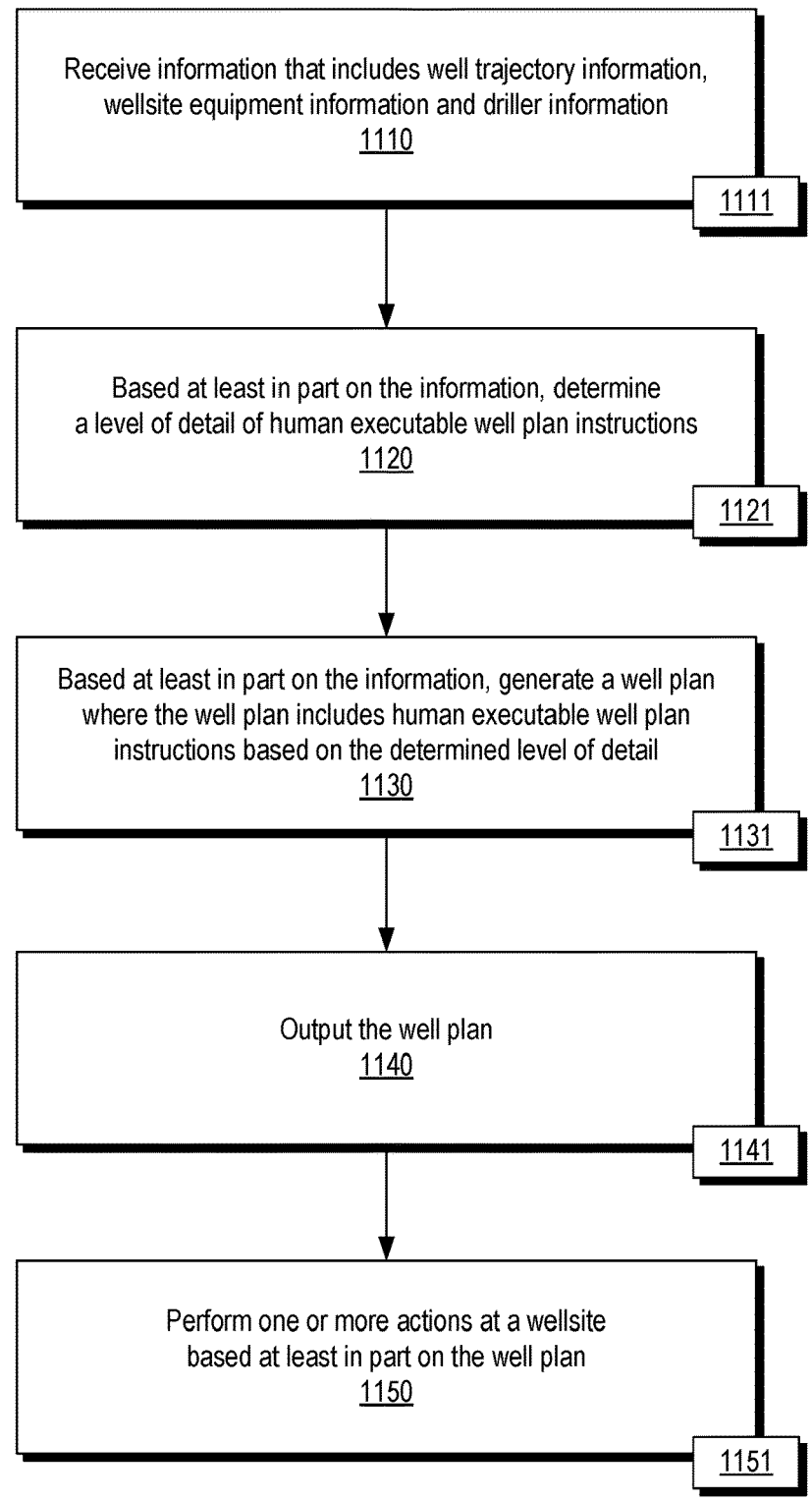
FIG. 11 illustrates an example of a method.

FIG. 11 shows an example of a method 1100 that includes a reception block 1110 for receiving information that includes well trajectory information, wellsite equipment information and driller information; a determination block 1120 for, based at least in part on the information, determining a level of detail of human executable well plan instructions; a generation block 1130 for, based at least in part on the information, generating a well plan where the well plan includes human executable well plan instructions based on the determined level of detail; and an output block 1140 for outputting the well plan. As shown, the method 1100 can include a performance block 1150 for performing one or more actions at a wellsite based at least in part on the output well plan, which may be digital, paper or paper and digital.

The method 1100 is shown in FIG. 11 in association with various computer-readable media (CRM) blocks 1111, 1121, 1131, 1141 and 1151. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1100. As an example, a computer-readable medium (CRM) may be a computer-readable storage medium that is non-transitory and not a carrier wave. As an example, the blocks 1111, 1121, 1131, 1141 and 1151 may be provided as one or more modules, for example, such as the one or more modules and/or instructions 1202 of the system 1200 of FIG. 12.

As an example, a method can include receiving information that includes well trajectory information, wellsite equipment information and driller information; based at least in part on the information, determining a level of detail of human executable well plan instructions; based at least in part on the information, generating a well plan where the well plan includes human executable well plan instructions based on the determined level of detail; and outputting the well plan. In such an example, the level of detail of the human executable well plan instructions can correspond at least in part to positions along a well trajectory specified by the well plan and/or can correspond at least in part to drilling times for drilling a well trajectory specified by the well plan.

As an example, a method can include generating a well plan in a manner that generates well plan instructions at a plurality of levels of detail.

As an example, a method can include generating a well plan in a manner that generates digital, machine-executable instructions. In such an example, the digital, machine-executable instructions can be executable by wellsite equipment (e.g., computerized equipment at a wellsite, etc.).

As an example, a method can include determining a level of machine control and a level of human control where, for example, the method can include generating a well plan based at least in part on the level of machine control and the level of human control.

As an example, a method can include rendering a graphical user interface to a display that includes a graphical control for determining a level of detail of human executable well plan instructions.

As an example, a method can include rendering a graphical user interface to a display that includes a graphical control for determining a level of machine control for the well plan and/or rendering a graphical user interface to a display that includes a graphical control for determining a level of human control for the well plan.

As an example, a method can include, based at least in part on a well plan, performing at least one action via a drilling system at a wellsite; receiving feedback via the drilling system; based at least in part on the feedback, deciding to adjust the well plan; assessing one or more adjustments to the well plan; and, based at least in part on the assessing, generating an adjusted well plan. In such an example, the assessing one or more adjustments to the well plan can include comparing the one or more adjustments to one or more tolerances. In such an example, the method can include generating the adjusted well plan via the drilling system where the comparing indicates that the one or more adjustments comport with the one or more tolerances and, for example, generating the adjusted well plan via a well planning system remote from the drilling system where the comparing indicates that the one or more adjustments do not comport with the one or more tolerances.

As an example, a system can include one or more processors; memory operatively coupled to the one or more processors; and processor-executable instructions stored in the memory and executable by at least one of the one or more processors to instruct the system to receive information that includes well trajectory information, wellsite equipment information and driller information; based at least in part on the information, determine a level of detail of human executable well plan instructions; based at least in part on the information, generate a well plan where the well plan includes human executable well plan instructions based on the determined level of detail; and output the well plan. In such an example, the level of detail of the human executable well plan instructions can correspond at least in part to positions along a well trajectory specified by the well plan and/or can correspond at least in part to drilling times for drilling a well trajectory specified by the well plan.

As an example, a system can include processor-executable instructions stored in memory and executable by at least one of the one or more processors to instruct the system to determine a level of machine control and a level of human control to generate the well plan based at least in part on the level of machine control and the level of human control.

As an example, one or more computer-readable storage media can include computer-executable instructions executable to instruct a computing system to: receive information that includes well trajectory information, wellsite equipment information and driller information; based at least in part on the information, determine a level of detail of human executable well plan instructions; based at least in part on the information, generate a well plan where the well plan includes human executable well plan instructions based on the determined level of detail; and output the well plan. In such an example, the level of detail of the human executable well plan instructions can correspond at least in part to positions along a well trajectory specified by the well plan and/or can correspond at least in part to drilling times for drilling a well trajectory specified by the well plan.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 12:
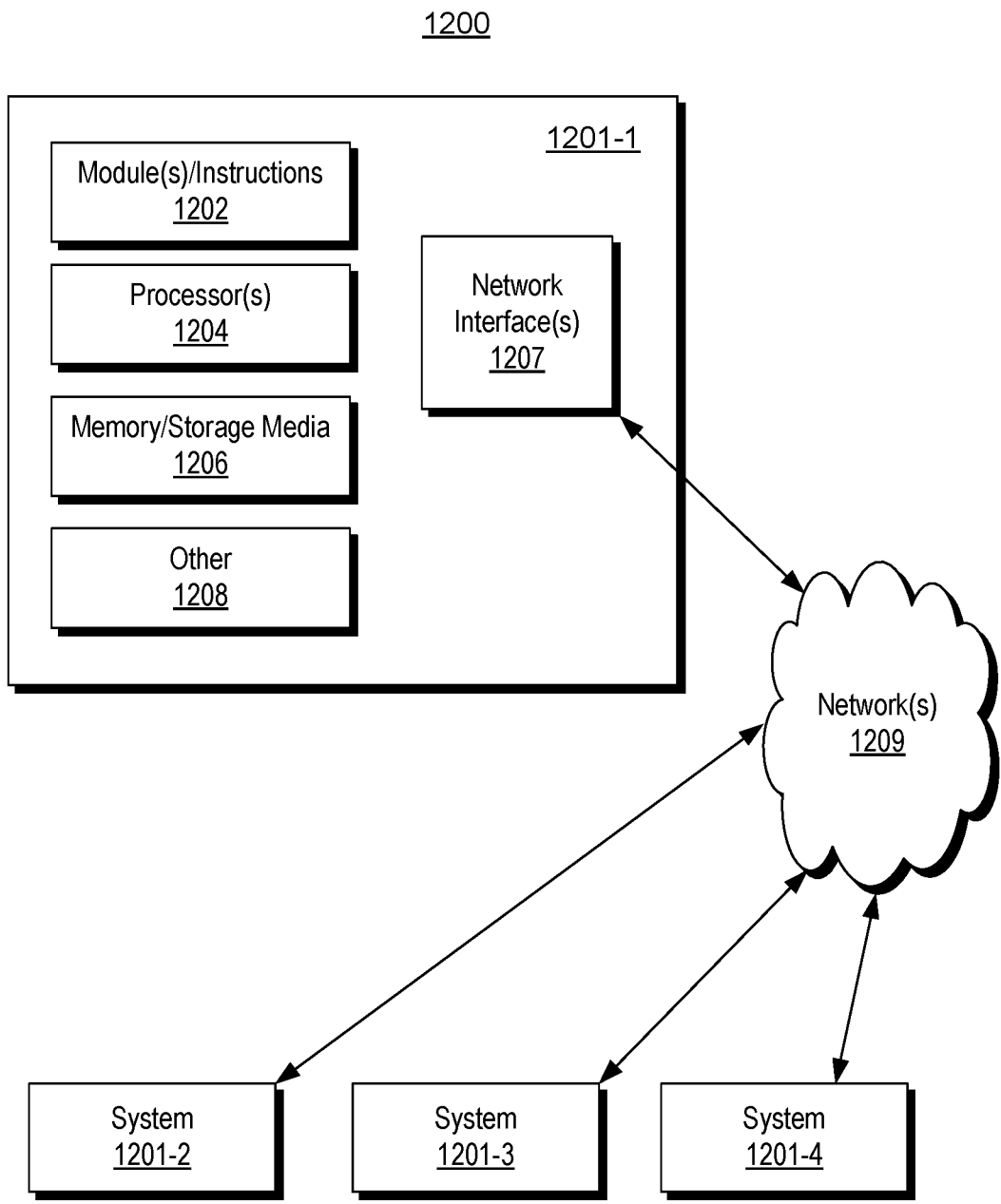
FIG. 12 illustrates examples of computing and networking equipment.

In some embodiments, a method or methods may be executed by a computing system. FIG. 12 shows an example of a system 1200 that can include one or more computing systems 1201-1, 1201-2, 1201-3 and 1201-4, which may be operatively coupled via one or more networks 1209, which may include wired and/or wireless networks.

As an example, a system can include an individual computer system or an arrangement of distributed computer systems. In the example of FIG. 12, the computer system 1201-1 can include one or more modules 1202, which may be or include processor-executable instructions, for example, executable to perform various tasks (e.g., receiving information, requesting information, processing information, simulation, outputting information, etc.).

As an example, a module may be executed independently, or in coordination with, one or more processors 1204, which is (or are) operatively coupled to one or more storage media 1206 (e.g., via wire, wirelessly, etc.). As an example, one or more of the one or more processors 1204 can be operatively coupled to at least one of one or more network interface 1207. In such an example, the computer system 1201-1 can transmit and/or receive information, for example, via the one or more networks 1209 (e.g., consider one or more of the Internet, a private network, a cellular network, a satellite network, etc.).

As an example, the computer system 1201-1 may receive from and/or transmit information to one or more other devices, which may be or include, for example, one or more of the computer systems 1201-2, etc. A device may be located in a physical location that differs from that of the computer system 1201-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1206 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 13:
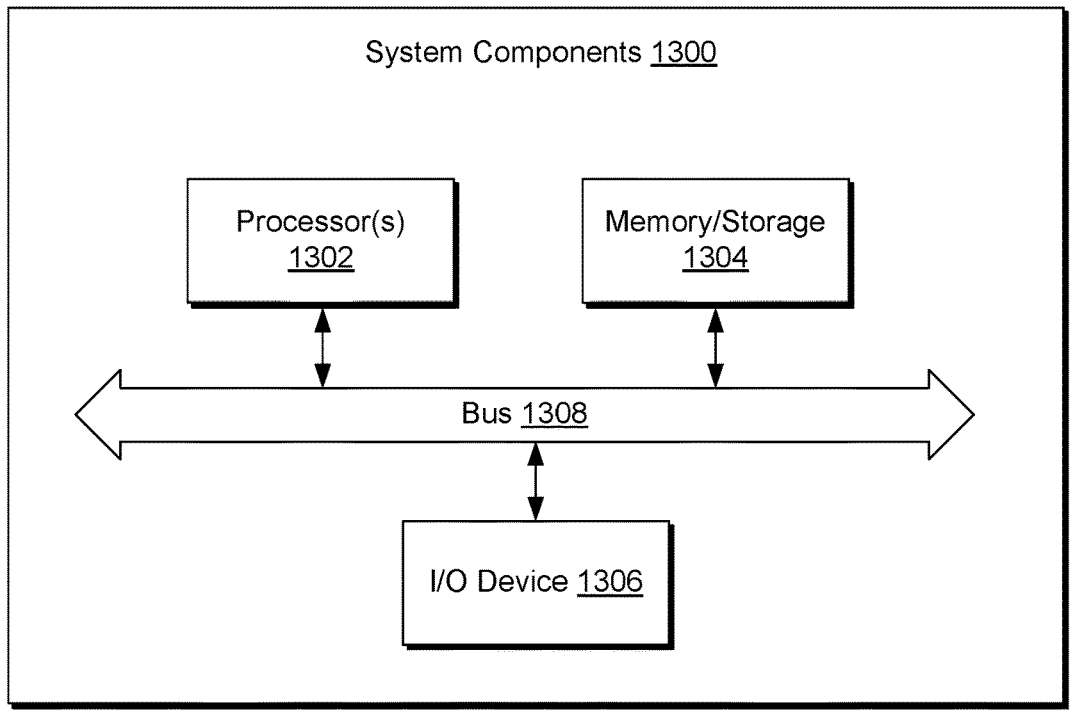
FIG. 13 illustrates example components of a system and a networked system.
Figure 13:
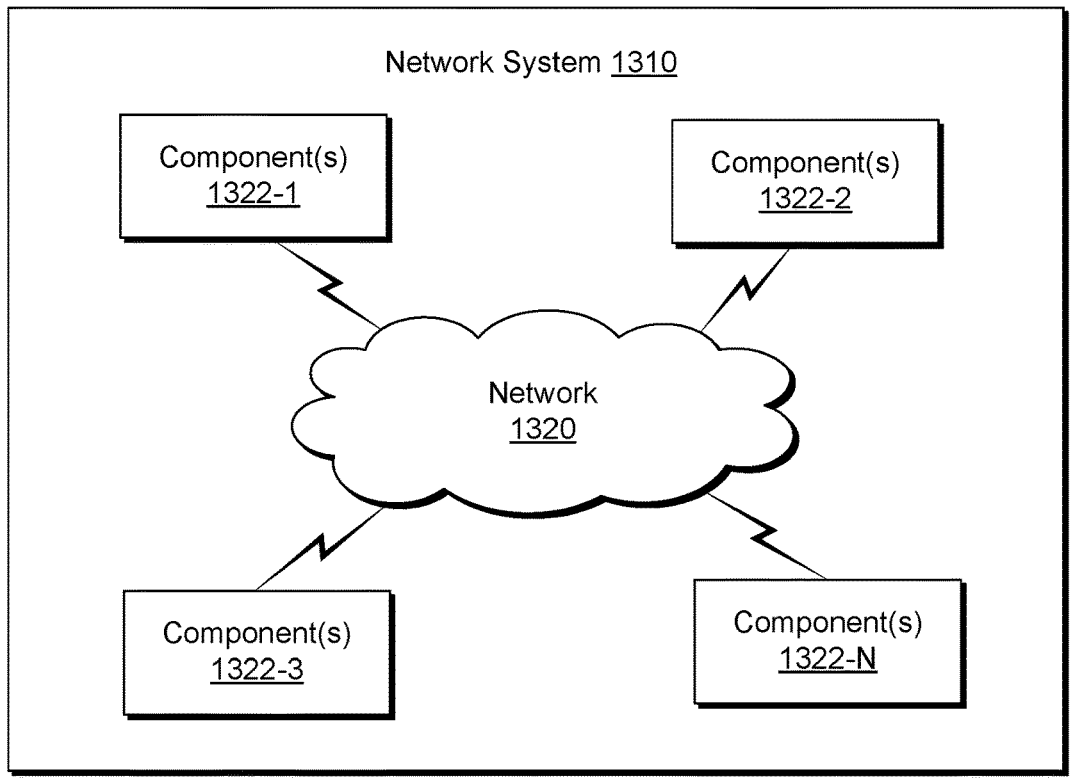

FIG. 13 shows components of a computing system 1300 and a networked system 1310. The system 1300 includes one or more processors 1302, memory and/or storage components 1304, one or more input and/or output devices 1306 and a bus 1308. According to an embodiment, instructions may be stored in one or more computer-readable media (e.g., memory/storage components 1304). Such instructions may be read by one or more processors (e.g., the processor(s) 1302) via a communication bus (e.g., the bus 1308), which may be wired or wireless. The one or more processors may execute such instructions to implement (wholly or in part) one or more attributes (e.g., as part of a method). A user may view output from and interact with a process via an I/O device (e.g., the device 1306). According to an embodiment, a computer-readable medium may be a storage component such as a physical memory storage device, for example, a chip, a chip on a package, a memory card, etc.

According to an embodiment, components may be distributed, such as in the network system 1310. The network system 1310 includes components 1322-1, 1322-2, 1322-3, . . . 1322-N. For example, the components 1322-1 may include the processor(s) 1302 while the component(s) 1322-3 may include memory accessible by the processor(s) 1302. Further, the component(s) 1302-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
receiving control equipment capabilities for drilling control;
receiving drilling equipment capabilities for drilling equipment, wherein the drilling equipment comprises directional drilling equipment;
simulating drilling of a wellbore of a well using a simulator to generate a description of activities involved in directional drilling of the wellbore of the well and associated parameters that describe the activities, wherein the parameters comprise weight-on-bit, rotation rate, and mud weight;
generating a well plan that comprises the activities using a planning engine, wherein, for performance of the activities, the well plan comprises control equipment instructions for the parameters that account for the drilling equipment capabilities for directional drilling according to a well plan wellbore trajectory;
responsive to feedback from drilling, deciding to make an adjustment to the well plan;
automatically making a determination as to whether the adjustment is within one or more tolerances, wherein the tolerances comprise at least one wellbore distance tolerance related to the well plan wellbore trajectory and at least one force tolerance related to force level on at least one piece of the drilling equipment located downhole; and
based on the determination, wherein the adjustment is within the one or more tolerances, automatically adjusting the well plan using the planning engine and not the simulator and, wherein the adjustment is not within the one or more tolerances, automatically adjusting the well plan using the simulator and the planning engine.

2. The method of claim 1, wherein the well plan comprises a kick off depth.

3. The method of claim 2, wherein the kick off depth is for a transition from a vertical wellbore trajectory to a horizontal wellbore trajectory.

4. The method of claim 1, wherein the directional drilling equipment comprises a bottom-hole assembly (BHA).

5. The method of claim 1, wherein control equipment capabilities comprise telemetry capabilities.

6. The method of claim 5, wherein the drilling equipment comprises telemetry capabilities.

7. The method of claim 6, wherein the directional drilling equipment comprises a bottom-hole assembly (BHA) that comprises telemetry capabilities.

8. The method of claim 7, wherein the bottom-hole assembly (BHA) is configurable via commands.

9. The method of claim 1, comprising receiving driller capabilities modeled as a driller-based control system.

10. The method of claim 9, wherein the well plan comprises driller instructions that account for the driller capabilities and the drilling equipment capabilities.

11. The method of claim 1, wherein the control equipment instructions comprise instructions for automated drilling.

12. The method of claim 1, comprising executing at least a portion of the well plan and responsive to the executing receiving at least one log as at least a portion of the feedback.

13. The method of claim 1, comprising receiving well trajectory information, wherein the well plan specifies a well trajectory based at least in part on the well trajectory information.

14. The method of claim 1, wherein the well plan comprises a sequence for at least a portion of the activities and the parameters describing the activities, wherein the parameters comprise weight-on-bit, rotation rate, and mud weight.

15. A system comprising:
one or more processors;
memory operatively coupled to the one or more processors;
processor-executable instructions stored in the memory and executable by at least one of the processors to instruct the system to
receive control equipment capabilities for drilling control;
receive drilling equipment capabilities for drilling equipment, wherein the drilling equipment comprises directional drilling equipment;
simulate drilling of a wellbore of a well using a simulator to generate a description of activities involved in directional drilling of the wellbore of the well and associated parameters that describe the activities, wherein the parameters comprise weight-on-bit, rotation rate, and mud weight;
generate a well plan that comprises the activities using a planning engine, wherein, for performance of the activities, the well plan comprises control equipment instructions for the parameters that account for the drilling equipment capabilities for directional drilling according to a well plan wellbore trajectory;
responsive to feedback from drilling, decide to make an adjustment to the well plan;
automatically make a determination as to whether the adjustment is within one or more tolerances, wherein the tolerances comprise at least one wellbore distance tolerance related to the well plan wellbore trajectory and at least one force tolerance related to force level on at least one piece of the drilling equipment located downhole; and
based on the determination, wherein the adjustment is within the one or more tolerances, automatically adjust the well plan using the planning engine and not the simulator and, wherein the adjustment is not within the one or more tolerances, automatically adjust the well plan using the simulator and the planning engine.

16. One or more non-transitory computer-readable storage media comprising computer-executable instructions executable to instruct a computing system to:
receive control equipment capabilities for drilling control;
receive drilling equipment capabilities for drilling equipment, wherein the drilling equipment comprises directional drilling equipment;
simulate drilling of a wellbore of a well using a simulator to generate a description of activities involved in directional drilling of the wellbore of the well and associated parameters that describe the activities, wherein the parameters comprise weight-on-bit, rotation rate, and mud weight;
generate a well plan that comprises the activities using a planning engine, wherein, for performance of the activities, the well plan comprises control equipment instructions for the parameters that account for the drilling equipment capabilities for directional drilling according to a well plan wellbore trajectory;

responsive to feedback from drilling, decide to make an adjustment to the well plan;

automatically make a determination as to whether the adjustment is within one or more tolerances, wherein the tolerances comprise at least one wellbore distance tolerance related to the well plan wellbore trajectory and at least one force tolerance related to force level on at least one piece of the drilling equipment located downhole; and based on the determination, wherein the adjustment is within the one or more tolerances, automatically adjust the well plan using the planning engine and not the simulator and, wherein the adjustment is not within the one or more tolerances, automatically adjust the well plan using the simulator and the planning engine.

* * * * *